United States Patent [19]

Jewett et al.

[11] Patent Number: 5,317,752

[45] Date of Patent: May 31, 1994

[54] FAULT-TOLERANT COMPUTER SYSTEM WITH AUTO-RESTART AFTER POWER-FALL

[75] Inventors: Douglas E. Jewett; Phil Webster, both of Austin; Dave Aldridge, Lago Vista; Peter C. Norwood; Nikhil A. Mehta, both of Austin, all of Tex.

[73] Assignee: Tandem Computers Incorporated, Cupertino, Calif.

[21] Appl. No.: 977,734

[22] Filed: Nov. 16, 1992

Related U.S. Application Data

[63] Continuation of Ser. No. 461,402, Jan. 5, 1990, abandoned, which is a continuation-in-part of Ser. No. 455,127, Dec. 22, 1989, abandoned.

[51] Int. Cl.⁵ .............................................. G06F 11/00
[52] U.S. Cl. ............................ 395/750; 364/DIG. 1; 364/231.6; 364/273.4; 395/575; 371/66
[58] Field of Search ................. 395/750, 575, 550; 371/66, 11.3; 364/707

[56] References Cited

U.S. PATENT DOCUMENTS

| 3,681,578 | 8/1972 | Stevens | 235/153 |
|---|---|---|---|
| 3,959,778 | 5/1976 | Brette | 395/575 |
| 4,015,246 | 3/1977 | Hopkins, Jr. et al. | 340/172.5 |
| 4,213,174 | 7/1980 | Morley et al. | 395/725 |
| 4,234,920 | 11/1980 | Van Ness et al. | 395/575 |
| 4,253,144 | 2/1981 | Bellamy et al. | 395/425 |
| 4,316,245 | 2/1982 | Luu et al. | 364/650 |
| 4,321,666 | 3/1982 | Tasar et al. | 395/575 |
| 4,327,410 | 4/1982 | Patel et al. | 395/575 |
| 4,358,823 | 11/1982 | McDonald et al. | 395/575 |
| 4,412,281 | 10/1983 | Works | 395/575 |
| 4,432,051 | 2/1984 | Bogaert et al. | 395/550 |
| 4,438,494 | 3/1984 | Budde et al. | 395/575 |
| 4,458,307 | 7/1984 | McAnlis et al. | 395/575 |
| 4,541,094 | 9/1985 | Stiffler | 371/68 |
| 4,607,365 | 8/1986 | Greig et al. | 371/8 |
| 4,611,289 | 9/1986 | Coppola | 395/750 |
| 4,658,352 | 4/1987 | Nagasawa | 395/575 |
| 4,757,442 | 7/1988 | Sakata | 395/650 |
| 4,757,505 | 7/1988 | Marrington et al. | 371/66 |

(List continued on next page.)

OTHER PUBLICATIONS

S. Chang, "Multiple-Read Single Write Memory and its Applications", *IEEE Transactions on Computers,* Aug. 1990, pp. 689-694.

(List continued on next page.)

*Primary Examiner*—Michael R. Fleming
*Assistant Examiner*—Ayaz R. Sheikh
*Attorney, Agent, or Firm*—Graham & James

[57] ABSTRACT

A fault-tolerant computer system employs a power supply system including a battery backup so that upon AC power failure the system can execute an orderly shutdown, saving state to disk. A restart procedure restores the state existing at the time of power failure if the AC power has been restored by the time the shutdown is completed. This powerfail/autorestart procedure may be implemented in a fault-tolerant multiprocessor configuration having multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules. I/O functions are implemented using two identical I/O busses, each of which is separately coupled to only one of the memory modules. A number of I/O processors are coupled to both I/O busses. I/O devices are accessed through a pair of identical (redundant) I/O processors, but only one is designated to actively control a given device; in case of failure of one I/O processor, however, an I/O device can be accessed by the other one without system shutdown.

16 Claims, 11 Drawing Sheets

U.S. PATENT DOCUMENTS

| | | | |
|---|---|---|---|
| 4,763,333 | 8/1988 | Byrd | 371/66 |
| 4,819,159 | 4/1989 | Shipley et al. | 395/575 |
| 4,823,256 | 4/1989 | Bishop et al. | 395/575 |
| 4,845,419 | 7/1989 | Hacker | 320/39 |
| 4,868,832 | 9/1989 | Marington et al. | 371/66 |
| 4,907,150 | 3/1990 | Arroyo et al. | 395/575 |
| 4,907,232 | 3/1990 | Harper et al. | 371/36 |
| 4,959,774 | 9/1990 | Davis | 395/575 |
| 4,965,717 | 10/1990 | Cutts, Jr. et al. | 395/425 |
| 5,018,148 | 5/1991 | Patel et al. | 371/66 |
| 5,020,059 | 5/1991 | Gorin et al. | 371/11.3 |
| 5,212,797 | 5/1993 | Miyake et al. | 395/750 |

OTHER PUBLICATIONS

D. Nadel, "Closely Coupled asynchronous hierarchical and parallel processing in an open architecture," The 12th Annual International Symposium on Computer Architecture, Conference Proceedings, Boston, Mass. Jun. 17–19, 1985, pp. 215–220.

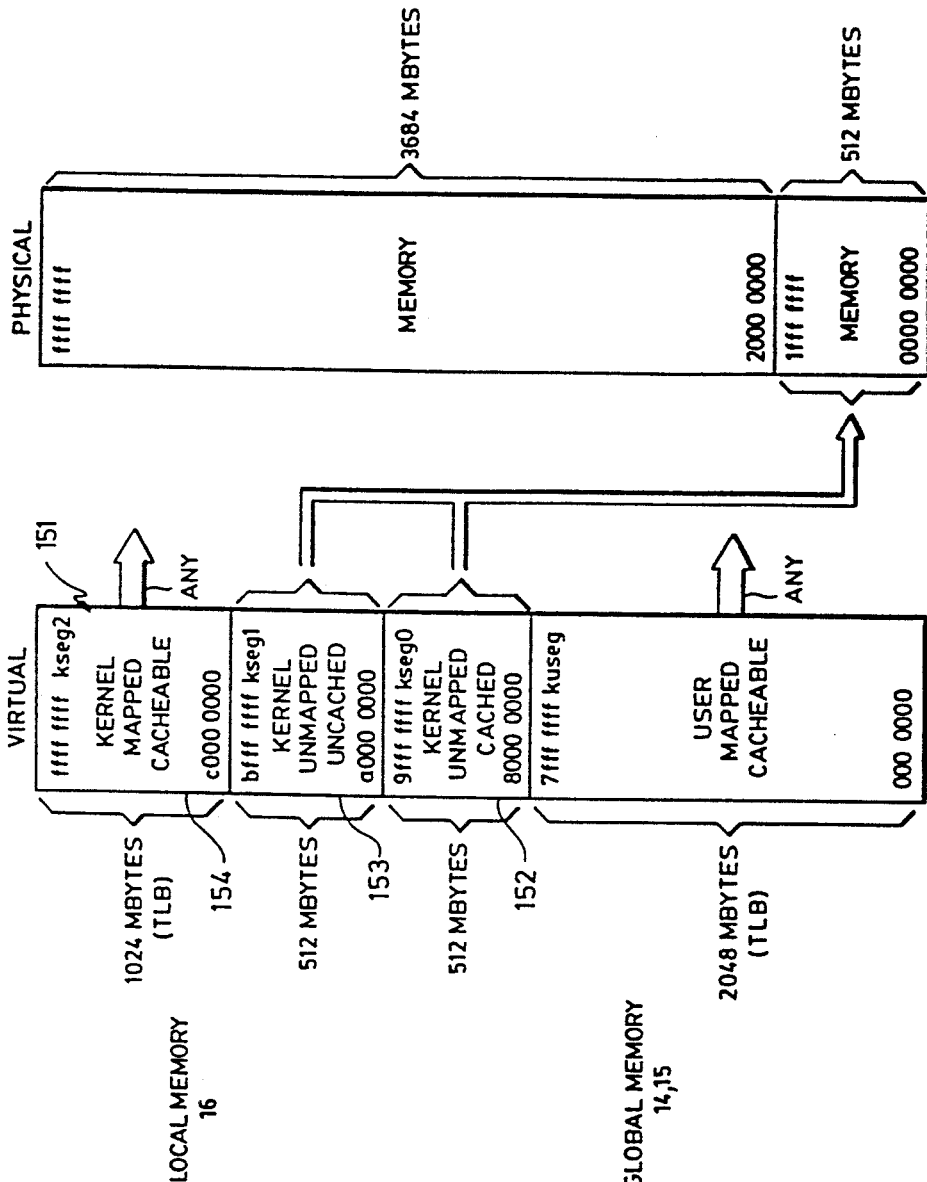
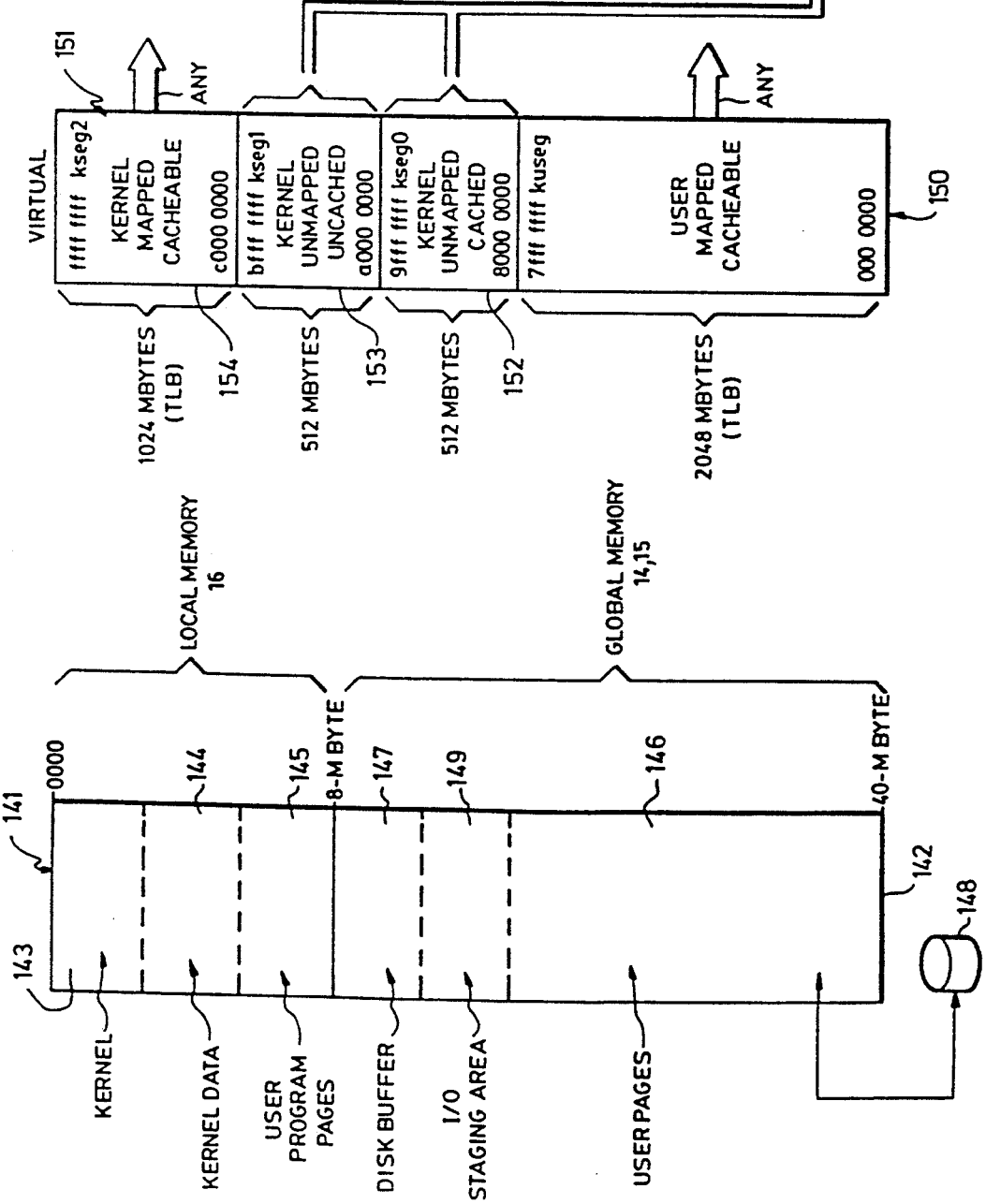

FAULT-TOLERANT COMPUTER SYSTEM WITH AUTO-RESTART AFTER POWER-FALL

RELATED CASES

This application is a continuation of copending application Ser. No. 07/461,402 filed on Jan. 5, 1990 which is now abandoned and is a continuation-in-part of application Ser. No. 07/455,127, now abandoned, filed Dec. 22, 1989. This application discloses subject matter also disclosed in copending U.S. patent applications Ser. Nos. 07/455,127, now abandoned and 07/455,065, filed Dec. 22, 1989, Ser. No. 455,218, subsequently abandoned in favor of continuation-in-part application Ser. No. 461,250, filed Dec. 22, 1989, Ser. Nos. 282,469, 282,538, 282,540, 282,629, 283,139 and 283,141, filed Dec. 9, 1988, and Ser. Nos. 283,573 and 283,574, filed Dec. 13, 1988, and further discloses subject matter also disclosed in prior copending application Ser. No. 118,503, filed Nov. 9, 1987, all of said applications being assigned to Tandem Computers Incorporated, the assignee of this invention.

BACKGROUND OF THE INVENTION

This invention relates to computer systems, and more particularly to a shutdown and restart procedure in the event of a power failure in a fault-tolerant multiprocessor system.

Highly reliable digital processing is achieved in various computer architectures employing redundancy. For example, TMR (triple modular redundancy) systems may employ three CPUs executing the same instruction stream, along with three separate main memory units and separate I/O devices which duplicate functions, so if one of each type of element fails, the system continues to operate. Another fault-tolerant type of system is shown in U.S. Pat. No. 4,228,496, issued to Katzman et al, for "Multiprocessor System", assigned to Tandem Computers Incorporated. Various methods have been used for synchronizing the units in redundant systems; for example, in said prior application Ser. No. 118,503, filed Nov. 9, 1987, by R. W. Horst, for "Method and Apparatus for Synchronizing a Plurality of Processors", also assigned to Tandem Computers Incorporated, a method of "loose" synchronizing is disclosed, in contrast to other systems which have employed a lockstep synchronization using a single clock, as shown in U.S. Pat. No. 4,453,215 for "Central Processing Apparatus for Fault-Tolerant Computing", assigned to Stratus Computer, Inc. A technique called "synchronization voting" is disclosed by Davies & Wakerly in "Synchronization and Matching in Redundant Systems", IEEE Transactions on Computers June 1978, pp. 531–539. A method for interrupt synchronization in redundant fault-tolerant systems is disclosed by Yondea et al in Proceeding of 15th Annual Symposium on Fault-Tolerant Computing, June 1985, pp. 246–251, "Implementation of Interrupt Handler for Loosely Synchronized TMR Systems". U.S. Pat. No. 4,644,498 for "Fault-Tolerant Real Time Clock" discloses a triple modular redundant clock configuration for use in a TMR computer system. U.S. Pat. No. 4,733,353 for "Frame Synchronization of Multiply Redundant Computers" discloses a synchronization method using separately-clocked CPUs which are periodically synchronized by executing a synch frame.

An important feature of a fault-tolerant computer system such as those referred to above is the ability for processes executing on the system to survive a power failure without loss or corruption of data. One way of preventing losses due to power failure is, of course, to prevent power failure; to this end, redundant AC power supplies and battery backup units may be provided. Nevertheless, there is a practical limit to the length of time power may be supplied by battery backup units, due to the cost, size and weight of storage batteries, and so it may be preferable to provide for orderly system shutdown upon AC power failure.

As high-performance microprocessor devices have become available, using higher clock speeds and providing greater capabilities, and as other elements of computer systems such as memory, disk drives, and the like have correspondingly become less expensive and of greater capability, the performance and cost of high-reliability processors has been required to follow the same trends. In addition, standardization on a few operating systems in the computer industry in general has vastly increased the availability of applications software, so a similar demand is made on the field of high-reliability systems; i.e., a standard operating system must be available.

It is therefore the principal object of this invention to provide an improved power-failure procedure in a high-reliability computer system, particularly of the fault-tolerant type. Another object is to provide improved operation of a redundant, fault-tolerant type of computing system in power-fail situations, and one in which reliability, high performance and reduced cost are possible. A further object is to provide a high-reliability computer system in which the performance, measured in reliability as well as speed and software compatibility, is improved but yet at a cost comparable to other alternatives of lower performance. An additional object is to provide a high-reliability computer system which is capable of executing an operating system which uses virtual memory management with demand paging, and having protected (supervisory or "kernel") mode; particularly an operating system also permitting execution of multiple processes; all at a high level of performance but yet in a reliable manner.

SUMMARY OF THE INVENTION

In accordance with one embodiment of the invention, a fault-tolerant computer system employs a power supply system including a battery backup so that upon AC power failure the system can execute an orderly shutdown, saving state to disk. A restart procedure restores the state existing at the time of power failure if the AC power has been restored by the time the shutdown is completed. This powerfail/auto-restart procedure may be implemented in a fault-tolerant, redundant computer system configuration having multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules. I/O functions are implemented using two identical I/O busses, each of which is separately coupled to only one of the memory modules. A number of I/O processors are coupled to both I/O busses. I/O devices are accessed through a pair of identical (redundant) I/O processors, but only one is designated to actively control a given device; in case of failure of one I/O processor, however, an I/O device can be accessed by the other one without system shutdown.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 9 is a physical memory map of the memories used in the system of FIGS. 1, 2, 3 and 4;

FIG. 13 is a timing diagram of events vs. time showing various events in the execution of a powerfail.

DETAILED DESCRIPTION OF SPECIFIC EMBODIMENT

Figure 1:
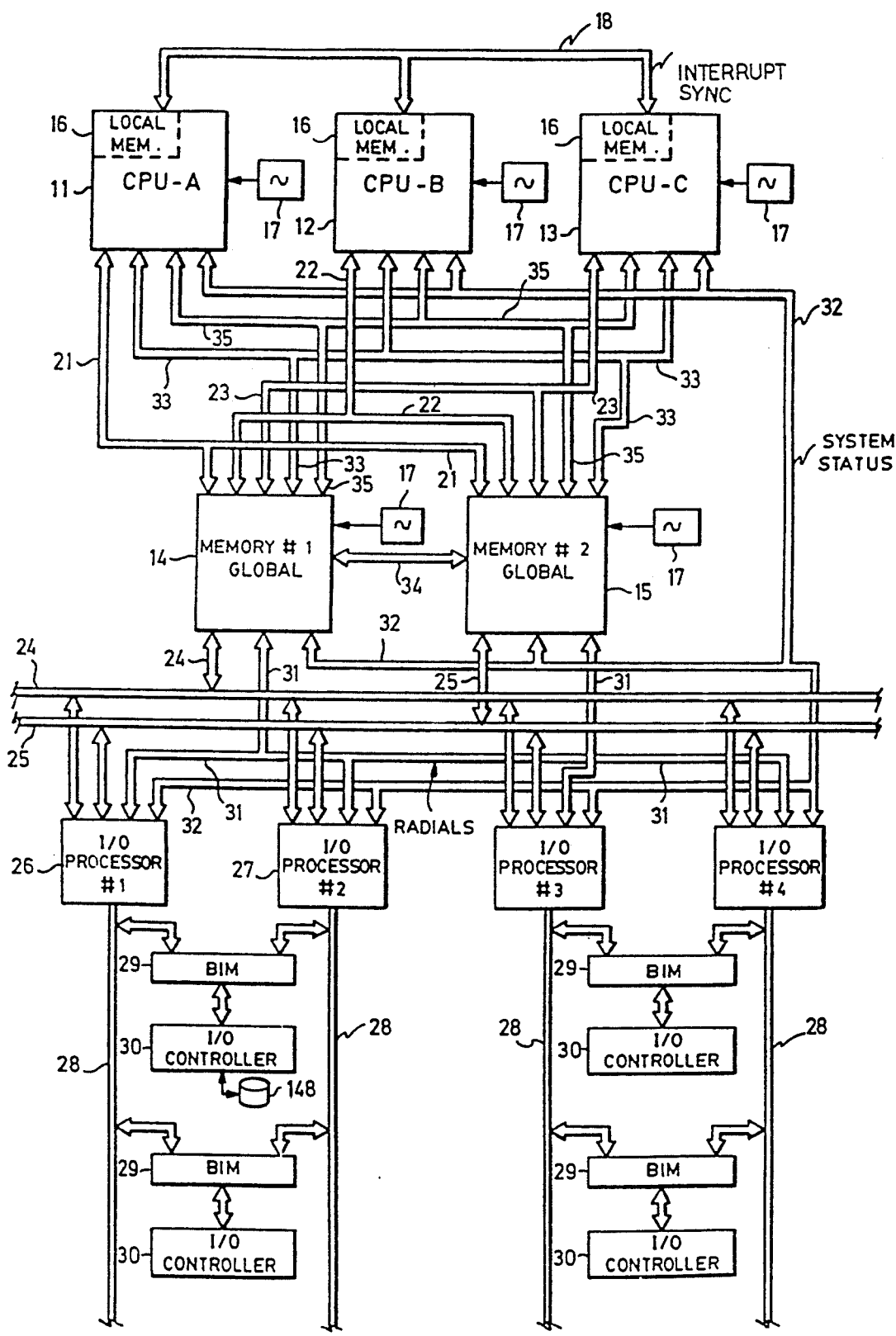
FIG. 1 is an electrical diagram in block form of a computer system according to one embodiment of the invention.

With reference to FIG. 1, a computer system of one type that may employ the power-fail and autorestart features of the invention is illustrated. Of course, these features may as well be used in systems of a more general type without the redundancy and the like, but will more likely find utility in fault-tolerant systems. The embodiment illustrated has three identical processors 11, 12 and 13, referred to as CPU-A, CPU-B and CPU-C, which operate as one logical processor, all three typically executing the same instruction stream; the only time the three processors are not executing the same instruction stream is in such operations as power-up self test, diagnostics and the like. The three processors are coupled to two memory modules 14 and 15, referred to as Memory-#1 and Memory-#2, each memory storing the same data in the same address space. In a preferred embodiment, each one of the processors 11, 12 and 13 contains its own local memory 16, as well, accessible only by the processor containing this memory.

Each one of the processors 11, 12 and 13, as well as each one of the memory modules 14 and 15, has its own separate clock oscillator 17; in this embodiment, the processors are not run in "lock step", but instead are loosely synchronized by a method such as is set forth in the above-mentioned application Ser. No. 118,503, i.e., using events such as external memory references to bring the CPUs into synchronization. External interrupts are synchronized among the three CPUs by a technique employing a set of busses 18 for coupling the interrupt requests and status from each of the processors to the other two; each one of the processors CPU-A, CPU-B and CPU-C is responsive to the three interrupt requests, its own and the two received from the other CPUs, to present an interrupt to the CPUs at the same point in the execution stream. The memory modules 14 and 15 vote the memory references, and allow a memory reference to proceed only when all three CPUs have made the same request (with provision for faults). In this manner, the processors are synchronized at the time of external events (memory references), resulting in the processors typically executing the same instruction stream, in the same sequence, but not necessarily during aligned clock cycles in the time between synchronization events. In addition, external interrupts are synchronized to be executed at the same point in the instruction stream of each CPU.

The CPU-A processor 11 is connected to the Memory-#1 module 14 and to the Memory-#2 module 15 by a bus 21; likewise the CPU-B is connected to the modules 14 and 15 by a bus 22, and the CPU-C is connected to the memory modules by a bus 23. These busses 21, 22, 23 each include a 32-bit multiplexed address/data bus, a command bus, and control lines for address and data strobes. The CPUs have control of these busses 21, 22 and 23, so there is no arbitration, or bus-request and bus-grant.

Each one of the memory modules 14 and 15 is separately coupled to a respective input/output bus 24 or 25, and each of these busses is coupled to two (or more) input/output processors 26 and 27. The system can have multiple I/O processors as needed to accommodate the I/O devices needed for the particular system configuration. Each one of the input/output processors 26 and 27 is connected to a bus 28, which may be of a standard configuration such as a VMEbus ™, and each bus 28 is connected to one or more bus interface modules 29 for interface with a standard I/O controller 30. Each bus interface module 29 is connected to two of the busses 28, so failure of one I/O processor 26 or 27, or failure of one of the bus channels 28, can be tolerated. The I/O processors 26 and 27 can be addressed by the CPUs 11, 12 and 13 through the memory modules 14 and 15, and can signal an interrupt to the CPUs via the memory modules. Disk drives, terminals with CRT screens and keyboards, and network adapters, are typical peripheral devices operated by the controllers 30. The controllers 30 may make DMA-type references to the memory modules 14 and 15 to transfer blocks of data. Each one of the I/O processors 26, 27, etc., has certain individual lines directly connected to each one of the memory modules for bus request, bus grant, etc.; these point-to-point connections are called "radials" and are included in a group of radial lines 31.

A system status bus 32 is individually connected to each one of the CPUs 11, 12 and 13, to each memory module 14 and 15, and to each of the I/O processors 26 and 27, for the purpose of providing information on the status of each element. This status bus provides information about which of the CPUs, memory modules and I/O processors is currently in the system and operating properly.

An acknowledge/status bus 33 connecting the three CPUs and two memory modules includes individual lines by which the modules 14 and 15 send acknowledge signals to the CPUs when memory requests are made by the CPUs, and at the same time a status field is sent to report on the status of the command and whether it executed correctly. The memory modules not only check parity on data read from or written to the global memory, but also check parity on data passing through the memory modules to or from the I/O busses 24 and 25, as well as checking the validity of commands. It is through the status lines in bus 33 that these checks are reported to the CPUs 11, 12 and 13, so if errors occur a fault routine can be entered to isolate a faulty component.

Even though both memory modules 14 and 15 are storing the same data in global memory, and operating to perform every memory reference in duplicate, one of these memory modules is designated as primary and the other as back-up, at any given time. Memory write operations are executed by both memory modules so both are kept current, and also a memory read operation is executed by both, but only the primary module actually loads the read-data back onto the busses 21, 22 and 23, and only the primary memory module controls the arbitration for multi-master busses 24 and 25. To keep the primary and back-up modules executing the same operations, a bus 34 conveys control information from primary to back-up. Either module can assume the role of primary at boot-up, and the roles can switch during operation under software control; the roles can also switch when selected error conditions are detected by the CPUs or other error-responsive parts of the system.

Certain interrupts generated in the CPUs are also voted by the memory modules 14 and 15. When the CPUs encounter such an interrupt condition (and are not stalled), they signal an interrupt request to the memory modules by individual lines in an interrupt bus 35, so the three interrupt requests from the three CPUs can be voted. When all interrupts have been voted, the memory modules each send a voted-interrupt signal to the three CPUs via bus 35. This voting of interrupts also functions to check on the operation of the CPUs. The three CPUs synch the voted interrupt CPU interrupt signal via the inter-CPU bus 18 and present the interrupt to the processors at a common point in the instruction stream. This interrupt synchronization is accomplished without stalling any of the CPUs.

Figure 2:
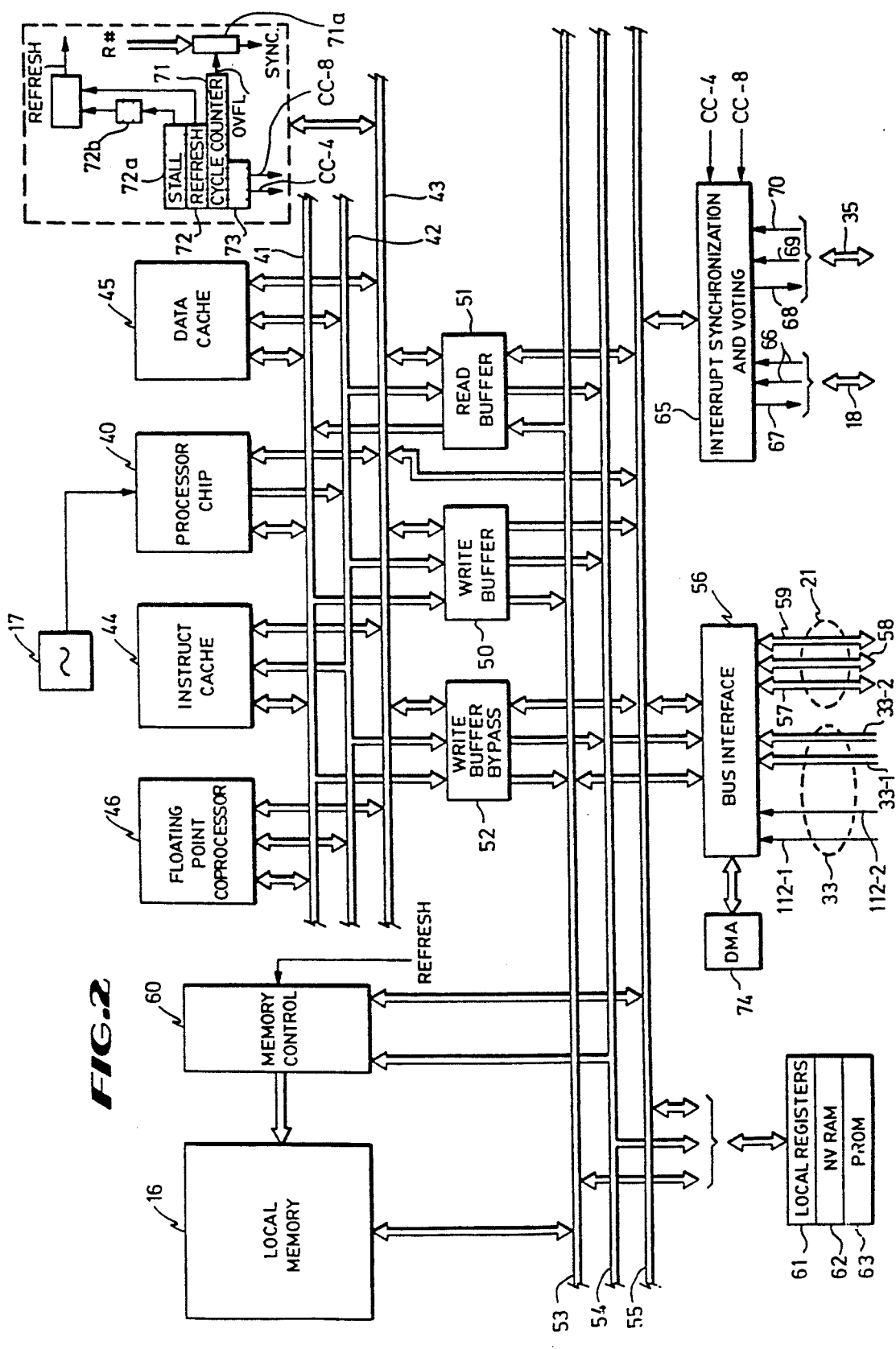
FIG. 2 is an electrical schematic diagram in block form of one of the CPUs of the system of FIG. 1.

CPU Module:

Referring now to FIG. 2, one of the processors 11, 12 or 13 is shown in more detail. All three CPU modules are of the same construction in a preferred embodiment, so only CPU-A will be described here. In order to keep costs within a competitive range, and to provide ready access to already-developed software and operating systems, it is preferred to use a commercially-available microprocessor chip, and any one of a number of devices may be chosen. The RISC (reduced instruction set) architecture has some advantage in implementing the loose synchronization as will be described, but more-conventional CISC (complex instruction set) microprocessors such as Motorola 68030 devices or Intel 80386 devices (available in 20-MHz and 25-MHz speeds) could be used. High-speed 32-bit RISC microprocessor devices are available from several sources in three basic types; Motorola produces a device as part number 88000, MIPS Computer Systems, Inc. and others produce a chip set referred to as the MIPS type, and Sun Microsystems has announced a so-called SPARC TM type (scalable processor architecture). Cypress Semiconductor of San Jose, Calif., for example, manufactures a microprocessor referred to as part number CY7C601 providing 20-MIPS (million instructions per second), clocked at 33-MHz, supporting the SPARC standard, and Fujitsu manufactures a CMOS RISC microprocessor, part number S-25, also supporting the SPARC standard.

The CPU board or module in the illustrative embodiment, used as an example, employs a microprocessor chip 40 which is in this case an R2000 device designed by MIPS Computer Systems, Inc., and also manufactured by Integrated Device Technology, Inc. The R2000 device is a 32-bit processor using RISC architecture to provide high performance, e.g., 12-MIPS at 16.67-MHz clock rate. Higher-speed versions of this device may be used instead, such as the R3000 that provides 20-MIPS at 25-MHz clock rate. The processor 40 also has a co-processor used for memory management, including a translation lookaside buffer to cache translations of logical to physical addresses. The processor 40 is coupled to a local bus having a data bus 41, an address bus 42 and a control bus 43. Separate instruction and data cache memories 44 and 45 are coupled to this local bus. These caches are each of 64K-byte size, for example, and are accessed within a single clock cycle of the processor 40. A numeric or floating point co-processor 46 is coupled to the local bus if additional performance is needed for these types of calculations; this numeric processor device is also commercially available from MIPS Computer Systems as part number R2010. The local bus 41, 42, 43, is coupled to an internal bus structure through a write buffer 50 and a read buffer 51. The write buffer is a commercially available device, part number R2020, and functions to allow the processor 40 to continue to execute Run cycles after storing data and address in the write buffer 50 for a write operation, rather than having to execute stall cycles while the write is completing.

In addition to the path through the write buffer 50, a path is provided to allow the processor 40 to execute write operations bypassing the write buffer 50. This path is a write buffer bypass 52 allows the processor, under software selection, to perform synchronous writes. If the write buffer bypass 52 is enabled (write buffer 50 not enabled) and the processor executes a write then the processor will stall until the write completes. In contrast, when writes are executed with the write buffer bypass 52 disabled the processor will not stall because data is written into the write buffer 50 (unless the write buffer is full). If the write buffer 50 is enabled when the processor 40 performs a write operation, the write buffer 50 captures the output data from bus 41 and the address from bus 42, as well as controls from bus 43. The write buffer 50 can hold up to four such data-address sets while it waits to pass the data on to the main memory. The write buffer runs synchronously with the clock 17 of the processor chip 40, so the processor-to-buffer transfers are synchronous and at the machine cycle rate of the processor. The write buffer 50 signals the processor if it is full and unable to accept data. Read operations by the processor 40 are checked against the addresses contained in the four-deep write buffer 50, so if a read is attempted to one of the data words waiting in the write buffer to be written to memory 16 or to global memory, the read is stalled until the write is completed.

The write and read buffers 50 and 51 are coupled to an internal bus structure having a data bus 53, an address bus 54 and a control bus 55. The local memory 16 is accessed by this internal bus, and a bus interface 56 coupled to the internal bus is used to access the system bus 21 (or bus 22 or 23 for the other CPUs). The separate data and address busses 53 and 54 of the internal bus (as derived from busses 41 and 42 of the local bus) are converted to a multiplexed address/data bus 57 in the system bus 21, and the command and control lines are correspondingly converted to command lines 58 and control lines 59 in this external bus.

The bus interface unit 56 also receives the acknowledge/status lines 33 from the memory modules 14 and 15. In these lines 33, separate status lines 33-1 or 33-2 are coupled from each of the modules 14 and 15, so the responses from both memory modules can be evaluated upon the event of a transfer (read or write) between CPUs and global memory, as will be explained.

The local memory 16, in one embodiment, comprises about 8-Mbyte of RAM which can be accessed in about three or four of the machine cycles of processor 40, and this access is synchronous with the clock 17 of this CPU, whereas the memory access time to the modules 14 and 15 is much greater than that to local memory, and this access to the memory modules 14 and 15 is asynchronous and subject to the synchronization overhead imposed by waiting for all CPUs to make the request then voting. For comparison, access to a typical commercially-available disk memory through the I/O processors 26, 27 and 29 is measured in milliseconds, i.e., considerably slower than access to the modules 14 and 15. Thus, there is a hierarchy of memory access by the CPU chip 40, the highest being the instruction and data caches 44 and 45 which will provide a hit ratio of perhaps 95% when using 64-KByte cache size and suitable fill algorithms. The second highest is the local memory 16, and again by employing contemporary virtual memory management algorithms a hit ratio of perhaps 95% is obtained for memory references for which a cache miss occurs but a hit in local memory 16 is found, in an example where the size of the local memory is about 8-MByte. The net result, from the standpoint of the processor chip 40, is that perhaps greater than 99% of memory references (but not I/O references) will be synchronous and will occur in either the same machine cycle or in three or four machine cycles.

The local memory 16 is accessed from the internal bus by a memory controller 60 which receives the addresses from address bus 54, and the address strobes from the control bus 55, and generates separate row and column addresses, and RAS and CAS controls, for example, if the local memory 16 employs DRAMs with multiplexed addressing, as is usually the case. Data is written to or read from the local memory via data bus 53. In addition, several local registers 61, as well as non-volatile memory 62 such as NVRAMs, and high-speed PROMs 63, as may be used by the operating system, are accessed by the internal bus; some of this part of the memory is used only at power-on, some is used by the operating system and may be almost continuously within the cache 44, and other may be within the non-cached part of the memory map.

External interrupts are applied to the processor 40 by one of the pins of the control bus 43 or 55 from an interrupt circuit 65 in the CPU module of FIG. 2. This type of interrupt is voted in the circuit 65, so that before an interrupt is executed by the processor 40 it is determined whether or not all three CPUs are presented with the interrupt; to this end, the circuit 65 receives interrupt pending inputs 66 from the other two CPUs 12 and 13, and sends an interrupt pending signal to the other two CPUs via line 67, these lines being part of the bus 18 connecting the three CPUs 11, 12 and 13 together. Also, for voting other types of interrupts, specifically CPU-generated interrupts, the circuit 65 can send an interrupt request from this CPU to both of the memory modules 14 and 15 by a line 68 in the bus 35, then receive separate voted-interrupt signals from the memory modules via lines 69 and 70; both memory modules will present the external interrupt to be acted upon. An interrupt generated in some external source such as a keyboard or disk drive on one of the I/O channels 28, for example, will not be presented to the interrupt pin of the chip 40 from the circuit 65 until each one of the CPUs 11, 12 and 13 is at the same point in the instruction stream, as will be explained.

Since the processors 40 are clocked by separate clock oscillators 17, there must be some mechanism for periodically bringing the processors 40 back into synchronization. Even though the clock oscillators 17 are of the same nominal frequency, e.g., 16.67-MHz, and the tolerance for these devices is about 25-ppm (parts per million), the processors can potentially become many cycles out of phase unless periodically brought back into synch. Of course, every time an external interrupt occurs the CPUs will be brought into synch in the sense of being interrupted at the same point in their instruction stream (due to the interrupt synch mechanism), but this does not help bring the cycle count into synch. The mechanism of voting memory references in the memory modules 14 and 15 will bring the CPUs into synch (in real time), as will be explained. However, some conditions result in long periods where no memory reference occurs, and so an additional mechanism is used to introduce stall cycles to bring the processors 40 back into synch. A cycle counter 71 is coupled to the clock 17 and the control pins of the processor 40 via control bus 43 to count machine cycles which are Run cycles (but not Stall cycles). This counter 71 includes a count register having a maximum count value selected to represent the period during which the maximum allowable drift between CPUs would occur (taking into account the specified tolerance for the crystal oscillators); when this count register overflows action is initiated to stall the faster processors until the slower processor or processors catch up. This counter 71 is reset whenever a synchronization is done by a memory reference to the memory modules 14 and 15. Also, a refresh counter 72 is employed to perform refresh cycles on the local memory 16, as will be explained. In addition, a counter 73 counts machine cycle which are Run cycles but not Stall cycles, like the counter 71 does, but this counter 73 is not reset by a memory reference; the counter 73 is used for interrupt synchronization as explained below, and to this end produces the output signals CC-4 and CC-8 to the interrupt synchronization circuit 65.

The processor 40 has a RISC instruction set which does not support memory-to-memory instructions, but instead only memory-to-register or register-to-memory instructions (i.e., load or store). It is important to keep frequently-used data and the currently-executing code in local memory. Accordingly, a block-transfer operation is provided by a DMA state machine 74 coupled to the bus interface 56. The processor 40 writes a word to a register in the DMA circuit 74 to function as a command, and writes the starting address and length of the block to registers in this circuit 74. In one embodiment, the microprocessor stalls while the DMA circuit takes over and executes the block transfer, producing the necessary addresses, commands and strobes on the busses 53-55 and 21. The command executed by the processor 40 to initiate this block transfer can be a read from a register in the DMA circuit 74. Since memory management in the Unix operating system relies upon demand paging, these block transfers will most often be pages being moved between global and local memory and I/O traffic. A page is 4-KBytes. Of course, the busses 21, 22 and 23 support single-word read and write transfers between CPUs and global memory; the block transfers referred to are only possible between local and global memory.

Figure 3:
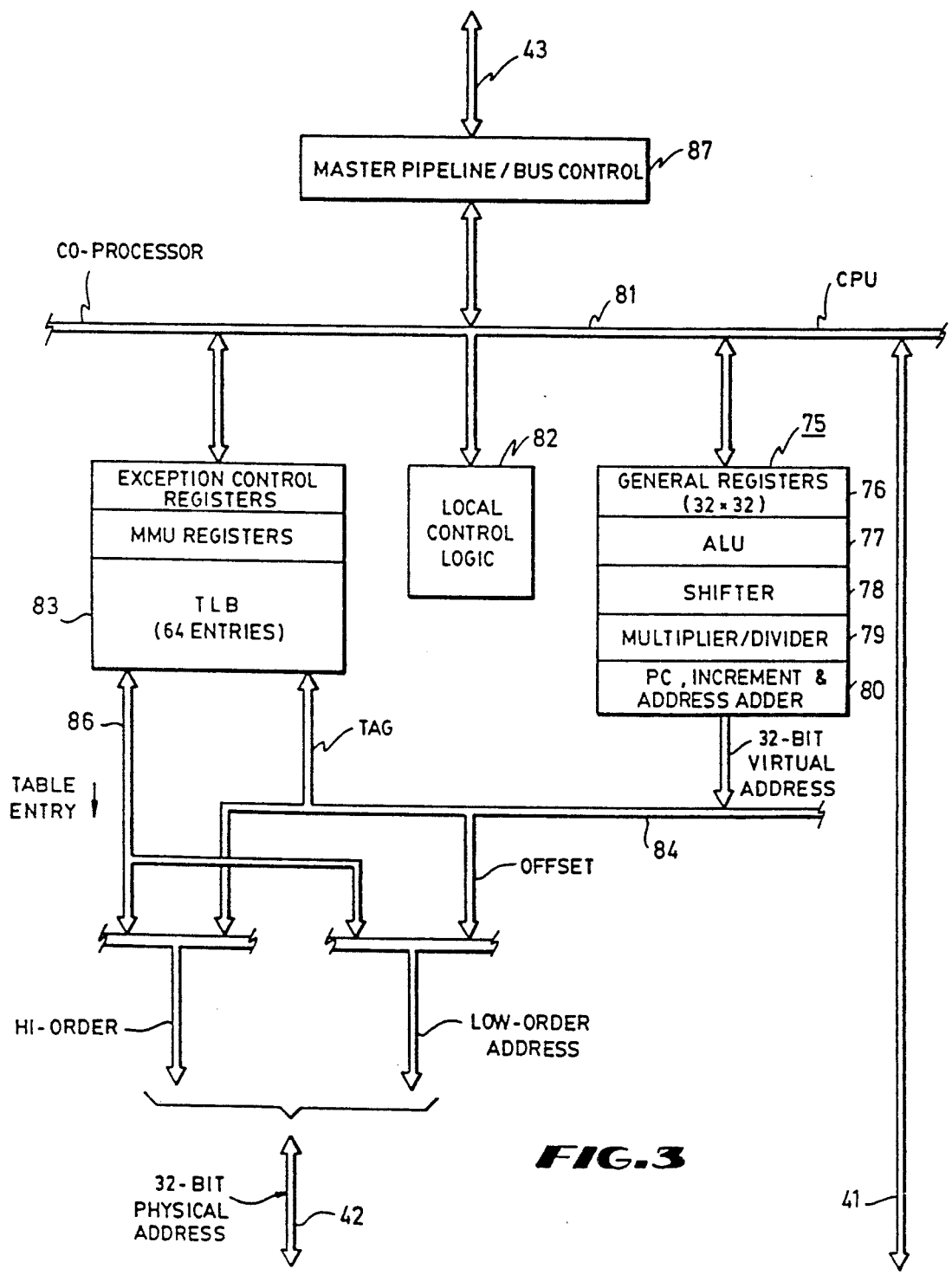
FIG. 3 is an electrical schematic diagram in block form of one of the microprocessor chip used in the CPU of FIG. 2.

The Processor:

Referring now to FIG. 3, the R2000 or R3000 type of microprocessor 40 of the example embodiment is shown in more detail. This device includes a main 32-bit CPU 75 containing thirty-two 32-bit general purpose registers 76, a 32-bit ALU 77, a zero-to-64 bit shifter 78, and a 32-by-32 multiply/divide circuit 79. This CPU also has a program counter 80 along with associated incrementer and adder. These components are coupled to a processor bus structure 81, which is coupled to the local data bus 41 and to an instruction decoder 82 with associated control logic to execute instructions fetched via data bus 41. The 32-bit local address bus 42 is driven by a virtual memory management arrangement including a translation lookaside buffer (TLB) 83 within an on-chip memory-management coprocessor. The TLB 83 contains sixty-four entries to be compared with a virtual address received from the microprocessor block 75 via virtual address bus 84. The low-order 16-bit part 85 of the bus 42 is driven by the low-order part of this virtual address bus 84, and the high-order part is from the bus 84 if the virtual address is used as the physical address, or is the tag entry from the TLB 83 via output 86 if virtual addressing is used and a hit occurs. The control lines 43 of the local bus are connected to pipeline and bus control circuitry 87, driven from the internal bus structure 81 and the control logic 82.

The microprocessor block 75 in the processor 40 is of the RISC type in that most instructions execute in one machine cycle, and the instruction set uses register-to-register and load/store instructions rather than having complex instructions involving memory references along with ALU operations. The main CPU 75 is highly pipelined to facilitate the goal of averaging one instruction execution per machine cycle. A single instruction is executed over a period including five machine cycles, where a machine cycle is one clock period or 60-nsec for a 16.67-MHz clock 17. Construction and operation of the R2000 processor is disclosed in Kane, "MIPS R2000 RISC Architecture", Prentice Hall, 1987.

Figure 4:
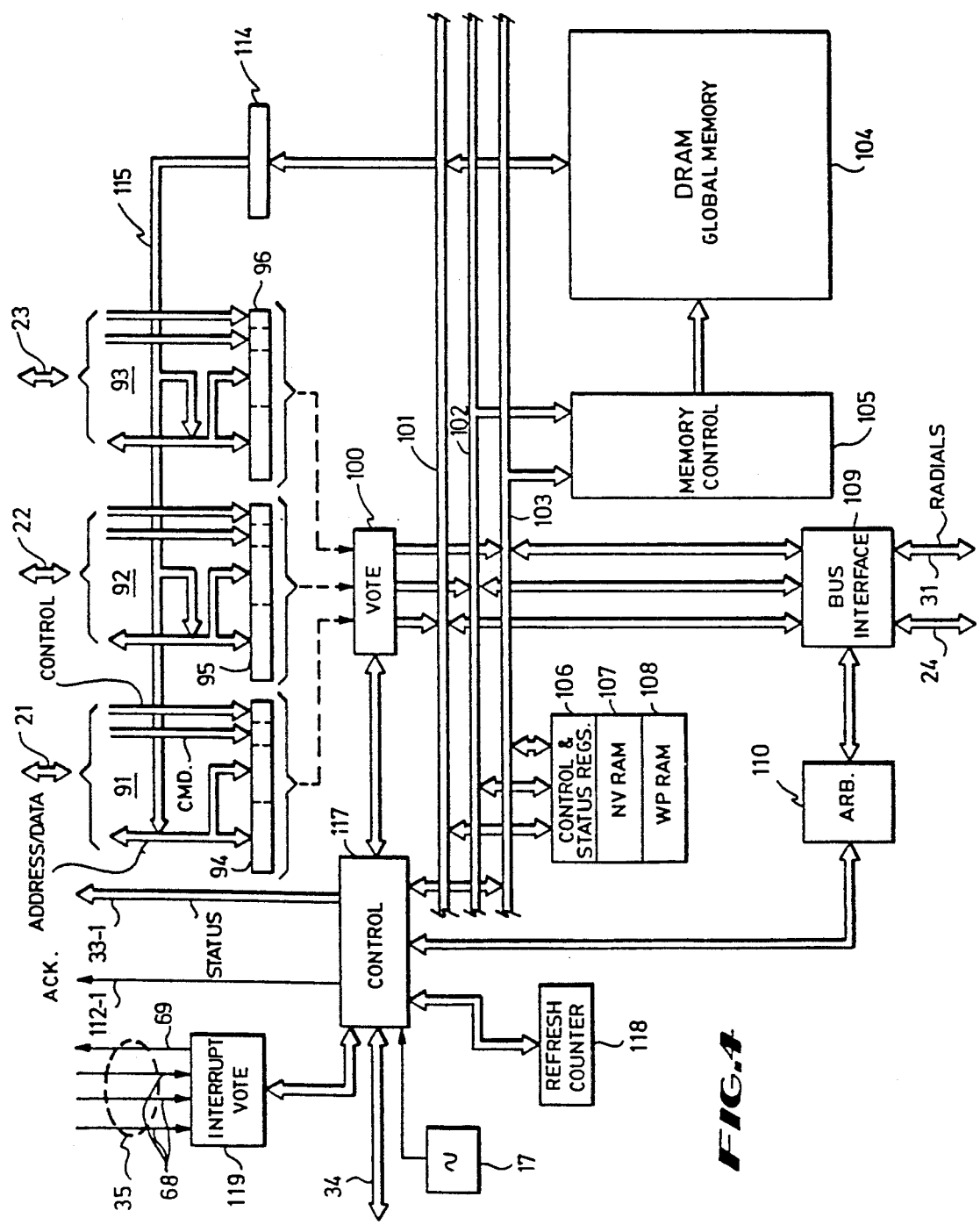
FIG. 4 is an electrical schematic diagram in block form of one of the memory modules in the computer system of FIG. 1.

Memory Module:

With reference to FIG. 4, one of the memory modules 14 or 15 is shown in detail. Both memory modules are of the same construction in a preferred embodiment, so only the Memory #1 module is shown. The memory module includes three input/output ports 91, 92 and 93 coupled to the three busses 21, 22 and 23 coming from the CPUs 11, 12 and 13, respectively. Inputs to these ports are latched into registers 94, 95 and 96 each of which has separate sections to store data, address, command and strobes for a write operation, or address, command and strobes for a read operation. The contents of these three registers are voted by a vote circuit 100 having inputs connected to all sections of all three registers. If all three of the CPUs 11, 12 and 13 make the same memory request (same address, same command), as should be the case since the CPUs are typically executing the same instruction stream, then the memory request is allowed to complete; however, as soon as the first memory request is latched into any one of the three latches 94, 95 or 96, it is passed on immediately to begin the memory access. To this end, the address, data and command are applied to an internal bus including data bus 101, address bus 102 and control bus 103. From this internal bus the memory request accesses various resources, depending upon the address, and depending upon the system configuration.

In one embodiment, a large DRAM 104 is accessed by the internal bus, using a memory controller 105 which accepts the address from address bus 102 and memory request and strobes from control bus 103 to generate multiplexed row and column addresses for the DRAM so that data input/output is provided on the data bus 101. This DRAM 104 is also referred to as global memory, and is of a size of perhaps 32-MByte in one embodiment. In addition, the internal bus 101-103 can access control and status registers 106, a quantity of non-volatile RAM 107, and write-protect RAM 108. The memory reference by the CPUs can also bypass the memory in the memory module 14 or 15 and access the I/O busses 24 and 25 by a bus interface 109 which has inputs connected to the internal bus 101-103. A bus arbitrator 110 on the memory module designated the primary module controls the bus interface 109. If a memory module is the backup module, the bus 34 controls the bus interface 109.

A memory access to the DRAM 104 is initiated as soon as the first request is latched into one of the latches 94, 95 or 96, but is not allowed to complete unless the vote circuit 100 determines that a plurality of the requests are the same, with provision for faults. The arrival of the first of the three requests causes the access to the DRAM 104 to begin. For a read, the DRAM 104 is addressed, the sense amplifiers are strobed, and the data output is produced at the DRAM outputs, so if the vote is good after the third request is received then the requested data is ready for immediate transfer back to the CPUs. In this manner, voting is overlapped with DRAM access.

Figure 5:
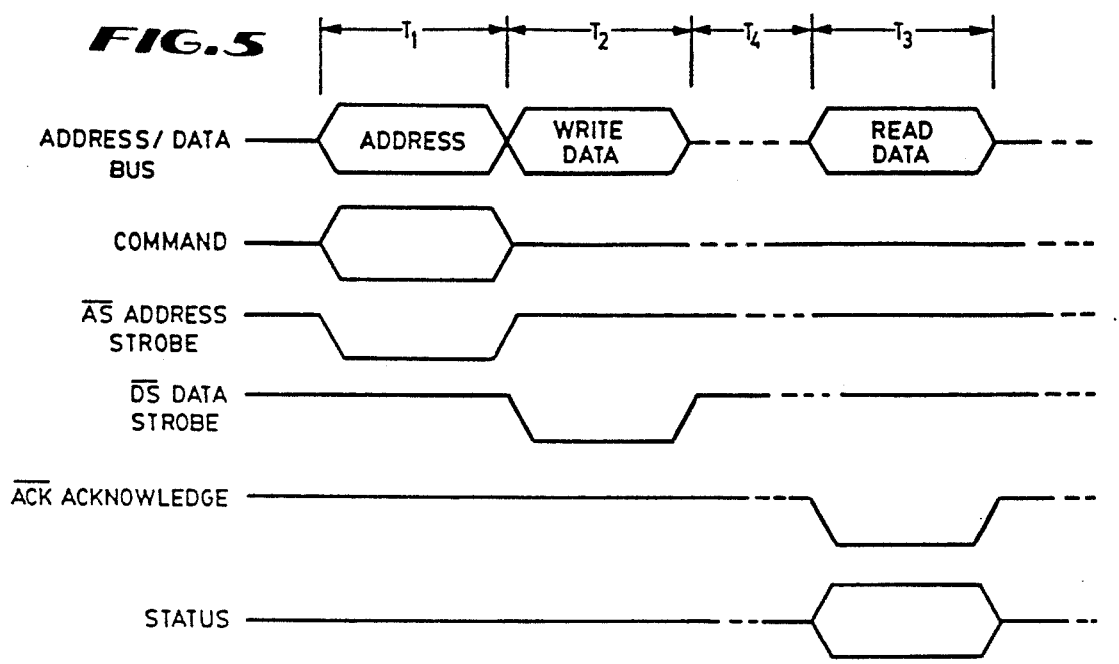
FIG. 5 is a timing diagram showing events occurring on the CPU to memory busses in the system of FIG. 1.

Referring to FIG. 5, the busses 21, 22 and 23 apply memory requests to ports 91, 92 and 93 of the memory modules 14 and 15 in the format illustrated. Each of these busses consists of thirty-two bidirectional multiplexed address/data lines, thirteen unidirectional command lines, and three strobes. The command lines include a field which specifies the type of bus activity, such as read, write, block transfer, single transfer, I/O read or write, etc. Also, a field functions as a byte enable for the four bytes. The three strobes are AS, address strobe, DS, data strobe, and TOS, take ownership strobe. The CPUs 11, 12 and 13 each control their own bus 21, 22 or 23; in this embodiment, these are not multi-master busses, there is no contention or arbitration. For a write, the CPU drives the address and command onto the bus in one cycle along with the address strobe AS (active low), then in a subsequent cycle (possibly the next cycle, but not necessarily) drives the data onto the address/data lines of the bus at the same time as a data strobe DS. The address strobe AS from each CPU causes the address and command then appearing at the ports 91, 92 or 93 to be latched into the address and command sections of the registers 94, 95 and 96, as these strobes appear, then the data strobe DS causes the data to be latched. When a plurality (two out of three in this embodiment) of the busses 21, 22 and 23 drive the same memory request into the latches 94, 95 and 96, the vote circuit 100 passes on the final command to the bus 103 and the memory access will be executed; if the command is a write, an acknowledge ACK signal is sent back to each CPU by a line 112 (specifically line 112-1 for Memory #1 and line 112-2 for Memory #2) as soon as the write has been executed, and at the same time status bits are driven via acknowledge/status bus 33 (specifically lines 33-1 for Memory #1 and lines 33-2 for Memory #2) to each CPU at time T3 of FIG. 5. The delay T4 between the last strobe DS (or AS if a read) and the ACK at T3 is variable, depending upon how many cycles out of synch the CPUs are at the time of the memory request, and depending upon the delay in the voting circuit and the phase of the internal independent clock 17 of the memory module 14 or 15 compared to the CPU clocks 17. If the memory request issued by the CPUs is a read, then the ACK signal on lines 112-1 and 112-2 and the status bits on lines 33-1 and 33-2 will be sent at the same time as the data is driven to the address/data bus, during time T3; this will release the stall in the CPUs and thus synchronize the CPU chips 40 on the same instruction. That is, the fastest CPU will have executed more stall cycles as it waited for the slower ones to catch up, then all three will be released at the same time, although the clocks 17 will probably be out of phase; the first instruction executed by all three CPUs when they come out of stall will be the same instruction.

All data being sent from the memory module 14 or 15 to the CPUs 11, 12 and 13, whether the data is read data from the DRAM 104 or from the memory locations 106-108, or is I/O data from the busses 24 and 25, goes through a register 114. This register is loaded from the internal data bus 101, and an output 115 from this register is applied to the address/data lines for busses 21, 22 and 23 at ports 91, 92 and 93 at time T3. Parity is checked when the data is loaded to this register 114. All data written to the DRAM 104, and all data on the I/O busses, has parity bits associated with it, but the parity bits are not transferred on busses 21, 22 and 23 to the CPU modules. Parity errors detected at the read register 114 are reported to the CPU via the status busses 33-1 and 33-2. Only the memory module 14 or 15 designated as primary will drive the data in its register 114 onto the busses 21, 22 and 23. The memory module designated as back-up or secondary will complete a read operation all the way up to the point of loading the register 114 and checking parity, and will report status on buses 33-1 and 33-2, but no data will be driven to the busses 21, 22 and 23.

A controller 117 in each memory module 14 or 15 operates as a state machine clocked by the clock oscillator 17 for this module and receiving the various command lines from bus 103 and busses 21-23, etc., to generate control bits to load registers and busses, generate external control signals, and the like. This controller also is connected to the bus 34 between the memory modules 14 and 15 which transfers status and control information between the two. The controller 117 in the module 14 or 15 currently designated as primary will arbitrate via arbitrator 110 between the I/O side (interface 109) and the CPU side (ports 91-93) for access to the common bus 101-103. This decision made by the controller 117 in the primary memory module 14 or 15 is communicated to the controller 117 of other memory module by the lines 34, and forces the other memory module to execute the same access.

The controller 117 in each memory module also introduces refresh cycles for the DRAM 104, based upon a refresh counter 118 receiving pulses from the clock oscillator 17 for this module. The DRAM must receive 512 refresh cycles every 8-msec, so on average there must be a refresh cycle introduced about every 15-microsec. The counter 118 thus produces an overflow signal to the controller 117 every 15-microsec., and if an idle condition exists (no CPU access or I/O access executing) a refresh cycle is implemented by a command applied to the bus 103. If an operation is in progress, the refresh is executed when the current operation is finished. For lengthy operations such as block transfers used in memory paging, several refresh cycles may be backed up and execute in a burst mode after the transfer is completed; to this end, the number of overflows of counter 118 since the last refresh cycle are accumulated in a register associated with the counter 118.

Interrupt requests for CPU-generated interrupts are received from each CPU 11, 12 and 13 individually by lines 68 in the interrupt bus 35; these interrupt requests are sent to each memory module 14 and 15. These interrupt request lines 68 in bus 35 are applied to an interrupt vote circuit 119 which compares the three requests and produces a voted interrupt signal on outgoing line 69 of the bus 35. The CPUs each receive a voted interrupt signal on the two lines 69 and 70 (one from each module 14 and 15) via the bus 35. The voted interrupts from each memory module 14 and 15 are ORed and presented to the interrupt synchronizing circuit 65. The CPUs, under software control, decide which interrupts to service. External interrupts, generated in the I/O processors or I/O controllers, are also signalled to the CPUs through the memory modules 14 and 15 via lines 69 and 70 in bus 35, and likewise the CPUs only respond to an interrupt from the primary module 14 or 15.

Figure 6:
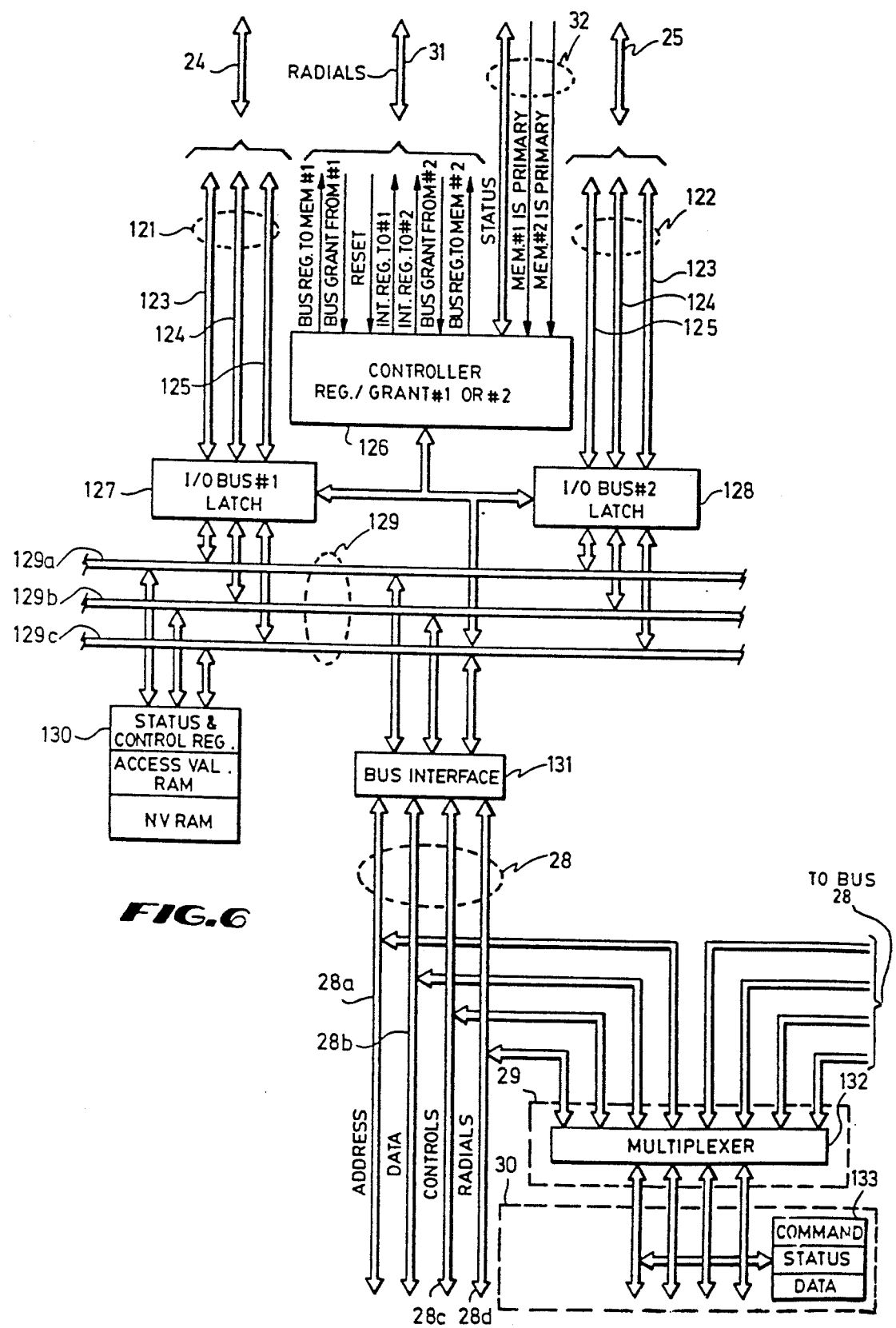
FIG. 6 is an electrical schematic diagram in block form of one of the I/O processors in the computer system of FIG. 1.

I/O Processor:

Referring now to FIG. 6, one of the I/O processors 26 or 27 is shown in detail. The I/O processor has two identical ports, one port 121 to the I/O bus 24 and the other port 122 to the I/O bus 25. Each one of the I/O busses 24 and 25 consists of: a 36-bit bidirectional multiplexed address/data bus 123 (containing 32-bits plus 4-bits parity), a bidirectional command bus 124 defining the read, write, block read, block write, etc., type of operation that is being executed, an address line that designates which location is being addressed, either internal to I/O processor or on busses 28, and the byte mask, and finally control lines 125 including address strobe, data strobe, address acknowledge and data acknowledge. The radial lines in bus 31 include individual lines from each I/O processor to each memory module: bus request from I/O processor to the memory modules, bus grant from the memory modules to the I/O processor, interrupt request lines from I/O processor to memory module, and a reset line from memory to I/O processor. Lines to indicate which memory module is primary are connected to each I/O processor via the system status bus 32. A controller or state machine 126 in the I/O processor of FIG. 6 receives the command, control, status and radial lines and internal data, and command lines from the busses 28, and defines the internal operation of the I/O processor, including operation of latches 127 and 128 which receive the contents of busses 24 and 25 and also hold information for transmitting onto the busses.

Figure 7:
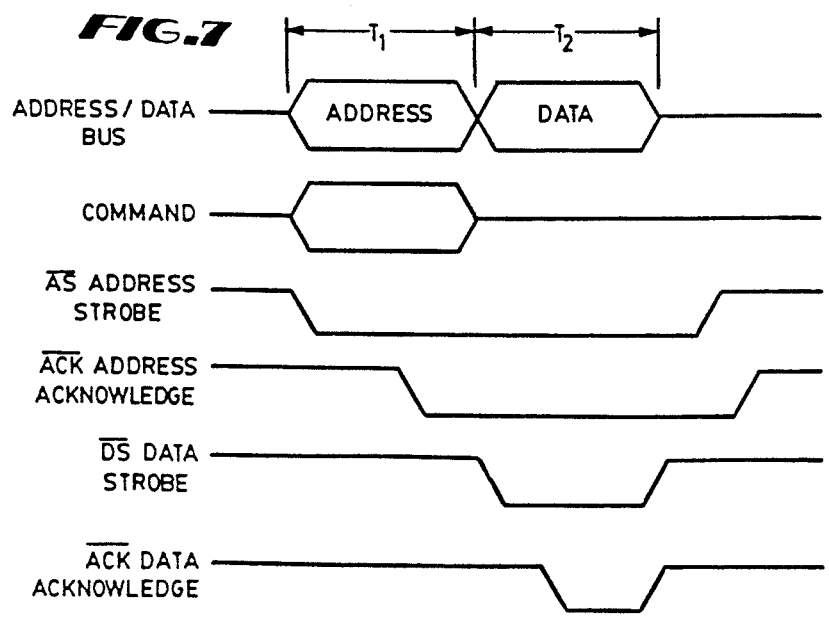
FIG. 7 is a timing diagram showing events vs. time for the transfer protocol between a memory module and an I/O processor in the system of FIG. 1.

Transfer on the busses 24 and 25 from memory module to I/O processor uses a protocol as shown in FIG. 7 with the address and data separately acknowledged. The arbitrator circuit 110 in the memory module which is designated primary performs the arbitration for ownership of the I/O busses 24 and 25. When a transfer from CPUs to I/O is needed, the CPU request is presented to the arbitration logic 110 in the memory module. When the arbiter 110 grants this request the memory modules apply the address and command to busses 123 and 124 (of both busses 24 and 25) at the same time the address strobe is asserted on bus 125 (of both busses 24 and 25) in time T1 of FIG. 7; when the controller 126 has caused the address to be latched into latches 127 or 128, the address acknowledge is asserted on bus 125, then the memory modules place the data (via both busses 24 and 25) on the bus 123 and a data strobe on lines 125 in time T2, following which the controller causes the data to be latched into both latches 127 and 128 and a data acknowledge signal is placed upon the lines 125, so upon receipt of the data acknowledge, both of the memory modules release the bus 24, 25 by de-asserting the address strobe signal. The I/O processor then deasserts the address acknowledge signal.

For transfers from I/O processor to the memory module, when the I/O processor needs to use the I/O bus, it asserts a bus request by a line in the radial bus 31, to both busses 24 and 25, then waits for a bus grant signal from an arbitrator circuit 110 in the primary memory module 14 or 15, the bus grant line also being one of the radials. When the bus grant has been asserted, the controller 126 then waits until the address strobe and address acknowledge signals on busses 125 are deasserted (i.e., false) meaning the previous transfer is completed. At that time, the controller 126 causes the address to be applied from latches 127 and 128 to lines 123 of both busses 24 and 25, the command to be applied to lines 124, and the address strobe to be applied to the bus 125 of both busses 24 and 25. When address acknowledge is received from both busses 24 and 25, these are followed by applying the data to the address/data busses, along with data strobes, and the transfer is completed with a data acknowledge signals from the memory modules to the I/O processor.

The latches 127 and 128 are coupled to an internal bus 129 including an address bus 129a, and data bus 129b and a control bus 129c, which can address internal status and control registers 130 used to set up the commands to be executed by the controller state machine 126, to hold the status distributed by the bus 32, etc. These registers 130 are addressable for read or write from the CPUs in the address space of the CPUs. A bus interface 131 communicates with the bus 28, under control of the controller 126. The bus 28 includes an address bus 28a, a data bus 28b, a control bus 28c, and radials 28d, and all of these lines are communicated through the bus interface modules 29 to the I/O controllers 30; the bus interface module 29 contains a multiplexer 132 to allow only one set of bus lines 28 (from one I/O processor or the other but not both) drive the controller 30. Internal to the controller 30 are command, control, status and data registers 133 which (as is standard practice for peripheral controllers of this type) are addressable from the CPUs 11, 12 and 13 for read and write to initiate and control operations in I/O devices.

Each one of the I/O controllers 30 on the busses 28 has connections via a multiplexer 132 in the BIM 29 to both I/O processors 26 and 27 and can be controlled by either one, but is bound to one or the other by the program executing in the CPUs. A particular address (or set of addresses) is established for control and data-transfer registers 133 representing each controller 30, and these addresses are maintained in an I/O page table (normally in the kernel data section of local memory) by the operating system. These addresses associate each controller 30 as being accessible only through either I/O processor #1 or #2, but not both. That is, a different address is used to reach a particular register 133 via I/O processor 26 compared to I/O processor 27. The bus interface 131 (and controller 126) can switch the multiplexer 132 to accept bus 28 from one or the other, and this is done by a write to the registers 130 of the I/O processors from the CPUs. Thus, when the device driver is called up to access this controller 30, the operating system uses these addresses in the page table to do it. The processors 40 access the controllers 30 by I/O writes to the control and data-transfer registers 133 in these controllers using the write buffer bypass path 52, rather than through the write buffer 50, so these are synchronous writes, voted by circuits 100, passed through the memory modules to the busses 24 or 25, thus to the selected bus 28; the processors 40 stall until the write is completed. The I/O processor board of FIG. 6 is configured to detect certain failures, such as improper commands, time-outs where no response is received over bus 28, parity-checked data if implemented, etc., and when one of these failures is detected the I/O processor quits responding to bus traffic, i.e., quits sending address acknowledge and data acknowledge as discussed above with reference to FIG. 7. This is detected by the bus interface 56 as a bus fault, resulting in an interrupt as will be explained, and self-correcting action if possible.

Synchronization:

The processors 40 used in the illustrative embodiment are of pipelined architecture with overlapped instruction execution, as discussed above. A synchronization technique used in this embodiment relies upon cycle counting, i.e., incrementing a counter 71 and a counter 73 of FIG. 2 every time an instruction is executed, generally as set forth in copending applications Ser. No. 282,538, Ser. No. 283,139, or Ser. No. 283,141, and application Ser. No. 118,503. Every time the pipeline advances an instruction is executed. One of the control lines in the control bus 43 is a signal RUN# which indicates that the pipeline is stalled; when RUN# is high the pipeline is stalled, when RUN# is low (logic zero) the pipeline advances each machine cycle. This RUN# signal is used in the numeric processor 46 to monitor the pipeline of the processor 40 so this coprocessor 46 can run in lockstep with its associated processor 40. This RUN# signal in the control bus 43 along with the clock 17 are used by the counters 71 and 73 to count Run cycles.

The size of the counter register 71, in a preferred embodiment, is chosen to be 4096, i.e., $2^{12}$, which is selected because the tolerances of the crystal oscillators used in the clocks 17 are such that the drift in about 4K Run cycles on average results in a skew or difference in number of cycles run by a processor chip 40 of about all that can be reasonably allowed for proper operation of the interrupt synchronization. One synchronization mechanism is to force action to cause the CPUs to synchronize whenever the counter 71 overflows. One such action is to force a cache miss in response to an overflow signal OVFL from the counter 71; this can be done by merely generating a false Miss signal (e.g., TagValid bit not set) on control bus 43 for the next I-cache reference, thus forcing a cache miss exception routine to be entered and the resultant memory reference will produce synchronization just as any memory reference does. Another method of forcing synchronization upon overflow of counter 71 is by forcing a stall in the processor 40, which can be done by using the overflow signal OVFL to generate a CP Busy (coprocessor busy) signal on control bus 43 via logic circuit 71a of FIG. 2; this CP Busy signal always results in the processor 40 entering stall until CP Busy is deasserted. All three processors will enter this stall because they are executing the same code and will count the same cycles in their counter 71, but the actual time they enter the stall will vary; the logic circuit 71a receives the RUN# signal from bus 43 of the other two processors via input R#, so when all three have stalled the CP Busy signal is released and the processors will come out of stall in synch again.

Thus, two synchronization techniques have been described, the first being the synchronization resulting from voting the memory references in circuits 100 in the memory modules, and the second by the overflow of counter 71 as just set forth. In addition, interrupts are synchronized, as will be described below. It is important to note, however, that the processors 40 are basically running free at their own clock speed, and are substantially decoupled from one another, except when synchronizing events occur. The fact that pipelined microprocessors are used would make lock-step synchronization with a single clock more difficult, and would degrade performance; also, use of the write buffer 50 serves to decouple the processors, and would be much less effective with close coupling of the processors. Likewise, the high-performance resulting from using instruction and data caches, and virtual memory management with the TLBs 83, would be more difficult to implement if close coupling were used, and performance would suffer.

Interrupt Synchronization:

The interrupt synchronization technique must distinguish between real time and so-called "virtual time". Real time is the external actual time, clock-on-the-wall time, measured in seconds, or for convenience, measured in machine cycles which are 60-nsec divisions in the example. The clock generators 17 each produce clock pulses in real time, of course. Virtual time is the internal cycle-count time of each of the processor chips 40 as measured in each one of the cycle counters 71 and 73, i.e., the instruction number of the instruction being executed by the processor chip, measured in instructions since some arbitrary beginning point.

The three CPUs of the system of FIGS. 1-3 are required to function as a single logical processor, thus requiring that the CPUs adhere to certain restrictions regarding their internal state to ensure that the programming model of the three CPUs is that of a single logical processor. Except in failure modes and in diagnostic functions, the instruction streams of the three CPUs are required to be identical. If not identical, then voting global memory accesses at voting circuitry 100 of FIG. 4 would be difficult; the voter would not know whether one CPU was faulty or whether it was executing a different sequence of instructions. The synchronization scheme is designed so that if the code stream of any CPU diverges from the code stream of the other CPUs, then a failure is assumed to have occurred. Interrupt synchronization provides one of the mechanisms of maintaining a single CPU image.

All interrupts are required to occur synchronous to virtual time, ensuring that the instruction streams of the three processors CPU-A, CPU-B and CPU-C will not diverge as a result of interrupts (there are other causes of divergent instruction streams, such as one processor reading different data than the data read by the other processors). Several scenarios exist whereby interrupts occurring asynchronous to virtual time would cause the code streams to diverge. For example, an interrupt causing a context switch on one CPU before process A completes, but causing the context switch after process A completes on another CPU would result in a situation where, at some point later, one CPU continues executing process A, but the other CPU cannot execute process A because that process had already completed. If in this case the interrupts occurred asynchronous to virtual time, then just the fact that the exception program counters were different could cause problems. The act of writing the exception program counters to global memory would result in the voter detecting different data from the three CPUs, producing a vote fault.

Certain types of exceptions in the CPUs are inherently synchronous to virtual time. One example is a breakpoint exception caused by the execution of a breakpoint instruction. Since the instruction streams of the CPUs are identical, the breakpoint exception occurs at the same point in virtual time on all three of the CPUs. Similarly, all such internal exceptions inherently occur synchronous to virtual time. For example, TLB exceptions are internal exceptions that are inherently synchronous. TLB exceptions occur because the virtual page number does not match any of the entries in the TLB 83. Because the act of translating addresses is solely a function of the instruction stream (exactly as in the case of the breakpoint exception), the translation is inherently synchronous to virtual time. In order to ensure that TLB exceptions are synchronous to virtual time, the state of the TLBs 83 must be identical in all three of the CPUs 11, 12 and 13, and this is guaranteed because the TLB 83 can only be modified by software. Again, since all of the CPUs execute the same instruction stream, the state of the TLBs 83 are always changed synchronous to virtual time. So, as a general rule of thumb, if an action is performed by software then the action is synchronous to virtual time. If an action is performed by hardware, which does not use the cycle counters 71, then the action is generally synchronous to real time.

External exceptions are not inherently synchronous to virtual time. I/O devices 26, 27 or 30 have no information about the virtual time of the three CPUs 11, 12 and 13. Therefore, all interrupts that are generated by these I/O devices must be synchronized to virtual time before presenting to the CPUs, as explained below. Floating point exceptions are different from I/O device interrupts because the floating point coprocessor 46 is tightly coupled to the microprocessor 40 within the CPU.

External devices view the three CPUs as one logical processor, and have no information about the synchronaity or lack of synchronaity between the CPUs, so the external devices cannot produce interrupts that are synchronous with the individual instruction steam (virtual time) of each CPU. Without any sort of synchronization, if some external device drove an interrupt at some instant of real time, and the interrupt was presented directly to the CPUs at this time then the three CPUs would take an exception trap at different instructions, resulting in an unacceptable state of the three CPUs. This is an example of an event (assertion of an interrupt) which is synchronous to real time but not synchronous to virtual time.

Figure 8:
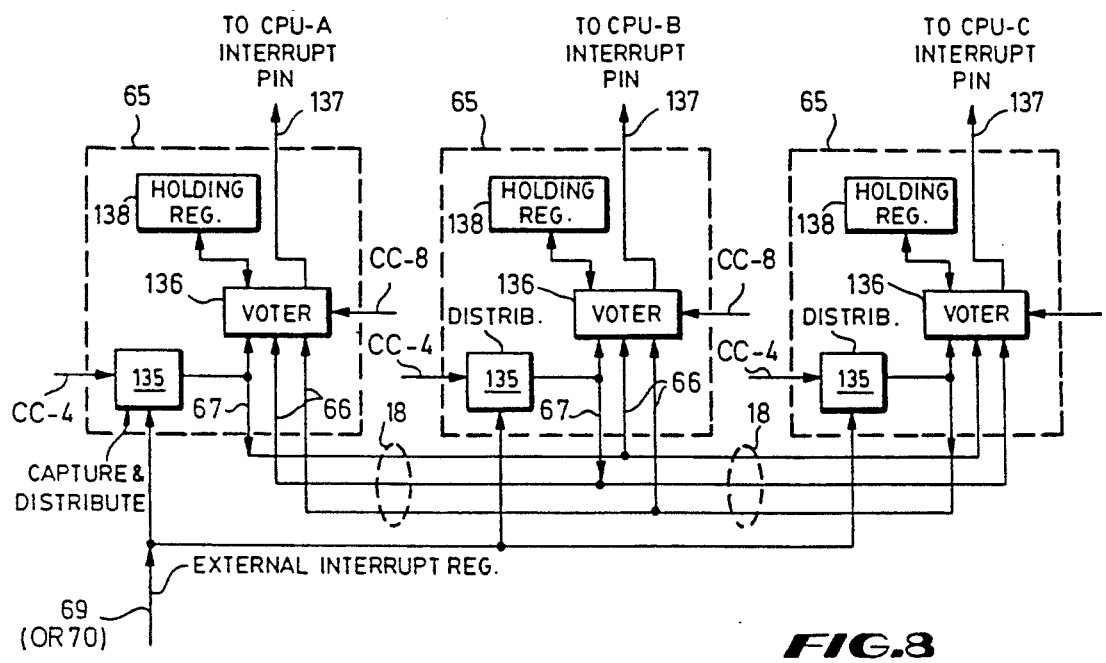
FIG. 8 is an electrical schematic diagram in block form of the interrupt synchronization circuit used in the CPU of FIG. 2.

Interrupts are synchronized to virtual time in the system of FIGS. 1–3 by performing a distributed vote on the interrupts and then presenting the interrupt to the processor on a predetermined cycle count. FIG. 8 shows a more detailed block diagram of the interrupt synchronization logic 65 of FIG. 2. Each CPU contains a distributor 135 which captures the external interrupt from the line 69 or 70 coming from the modules 14 or 15; this capture occurs on a predetermined cycle count, e.g., at count-4 as signalled on an input line CC-4 from the counter 71. The captured interrupt is distributed to the other two CPUs via the inter-CPU bus 18. These distributed interrupts are called pending interrupts. There are three pending interrupts, one from each CPU 11, 12 and 13. A voter circuit 136 captures the pending interrupts and performs a vote to verify that all of the CPUs did receive the external interrupt request. On a predetermined cycle count (detected from the cycle counter 71), in this example cycle-8 received by input line CC-8, the interrupt voter 136 presents the interrupt to the interrupt pin on its respective microprocessor 40 via line 137 and control bus 55 and 43. Since the cycle count that is used to present the interrupt is predetermined, all of the microprocessors 40 will receive the interrupt on the same cycle count and thus the interrupt will have been synchronized to virtual time.

Memory Management:

The CPUs 11, 12 and 13 of FIGS. 1–3 have memory space organized as illustrated in FIG. 9. Using the example that the local memory 16 is 8-MByte and the global memory 14 or 15 is 32-MByte, note that the local memory 16 is part of the same continuous zero-to-40M map of CPU memory access space, rather than being a cache or a separate memory space; realizing that the 0–8M section is triplicated (in the three CPU modules), and the 8–40M section is duplicated, nevertheless logically there is merely a single 0–40M physical address space. An address over 8MByte on bus 54 causes the bus interface 56 to make a request to the memory modules 14 and 15, but an address under 8-MByte will access the local memory 16 within the CPU module itself. Performance is improved by placing more of the memory used by the applications being executed in local memory 16, and so as memory chips are available in higher densities at lower cost and higher speeds, additional local memory will be added, as well as additional global memory. For example, the local memory might be 32-MByte and the global memory 128-MByte. On the other hand, if a very minimum-cost system is needed, and performance is not a major determining factor, the system can be operated with no local memory, all main memory being in the global memory area (in memory modules 14 and 15), although the performance penalty is high for such a configuration.

The content of local memory portion 141 of the map of FIG. 9 is identical in the three CPUs 11, 12 and 13. Likewise, the two memory modules 14 and 15 contain identically the same data in their space 142 at any given instant. Within the local memory portion 141 is stored the kernel 143 (code) for the Unix operating system, and this area is physically mapped within a fixed portion of the local memory 16 of each CPU. Likewise, kernel data is assigned a fixed area 144 in each local memory 16; except upon boot-up, these blocks do not get swapped to or from global memory or disk. Another portion 145 of local memory 16 is employed for user program (and data) pages, which are swapped to area 146 of the global memory 14 and 15 under control of the operating system. The global memory area 142 is used as a staging area for user pages in area 146, and also as a disk buffer in an area 147; if the CPUs are executing code which performs a write of a block of data or code from local memory 16 to disk 148, then the sequence is to always write to a disk buffer area 147 instead because the time to copy to area 147 is negligible compared to the time to copy directly to the I/O processor 26 and 27 and thus via I/O controller 30 to disk 148. Then, while the CPUs proceed to execute other code, the write-to-disk operation is done, transparent to the CPUs, to move the block from area 147 to disk 148. In a like manner, the global memory area 146 is mapped to include an I/O staging 149 area, for similar treatment of I/O accesses other than disk (e.g., video).

Figure 10:
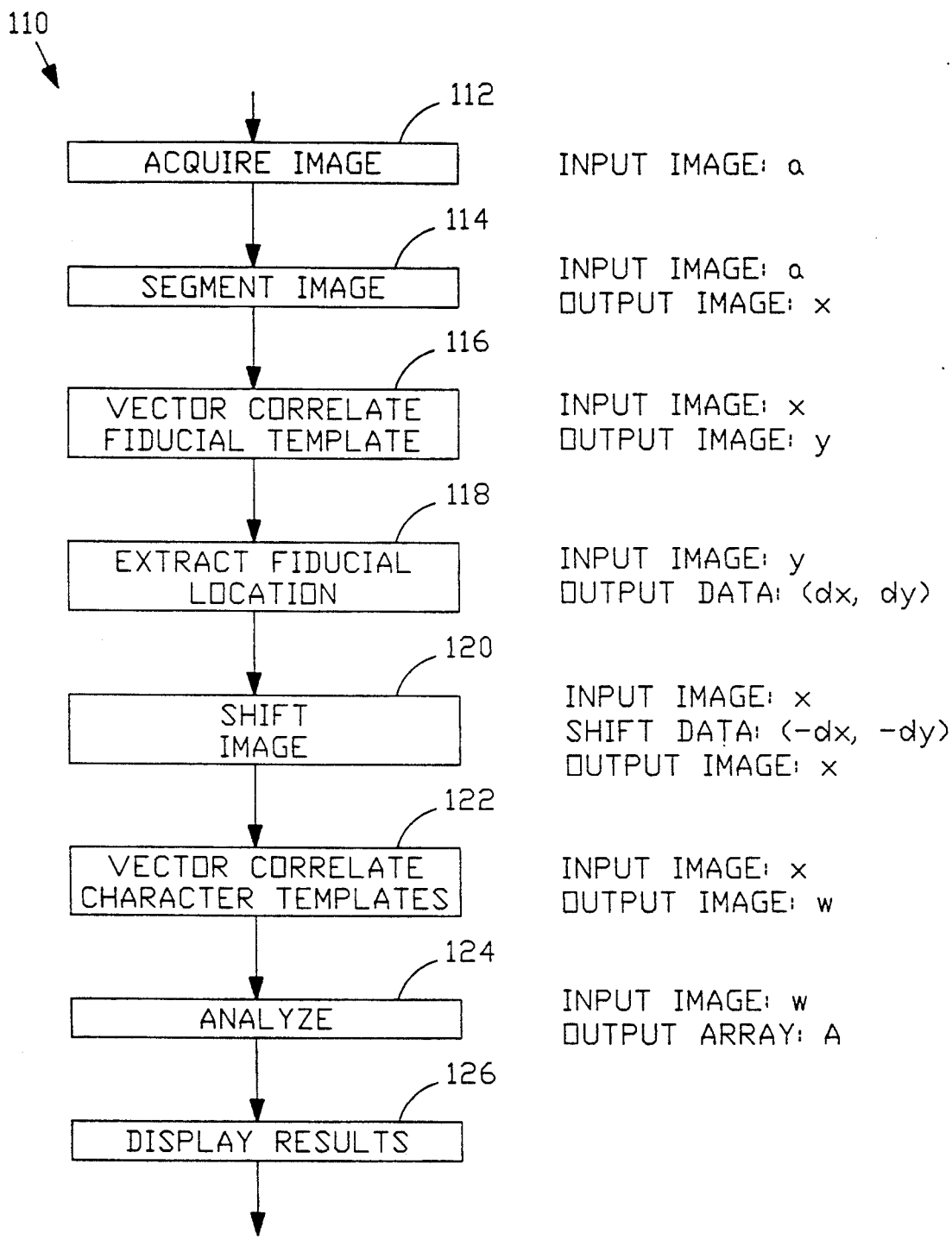
FIG. 10 is a virtual memory map of the CPUs used in the system of FIGS. 1, 2, 3 and 4.

The physical memory map of FIG. 9 is correlated with the virtual memory management system of the processor 40 in each CPU. FIG. 10 illustrates the virtual address map of the R2000 processor chip used in the example embodiment, although it is understood that other microprocessor chips supporting virtual memory management with paging and a protection mechanism would provide corresponding features.

In FIG. 10, two separate 2-GByte virtual address spaces 150 and 151 are illustrated; the processor 40 operates in one of two modes, user mode and kernel mode. The processor can only access the area 150 in the user mode, or can access both the areas 150 and 151 in the kernel mode. The kernel mode is analogous to the supervisory mode provided in many machines. The processor 40 is configured to operate normally in the user mode until an exception is detected forcing it into the kernel mode, where it remains until a restore from exception (RFE) instruction is executed. The manner in which the memory addresses are translated or mapped depends upon the operating mode of the microprocessor, which is defined by a bit in a status register. When in the user mode, a single, uniform virtual address space 150 referred to as "kuseg" of 2-GByte size is available. Each virtual address is also extended with a 6-bit process identifier (PID) field to form unique virtual addresses for up to sixty-four user processes. All references to this segment 150 in user mode are mapped through the TLB 83, and use of the caches 144 and 145 is determined by bit settings for each page entry in the TLB entries; i.e., some pages may be cachable and some not as specified by the programmer.

When in the kernel mode, the virtual address space includes both the areas 150 and 151 of FIG. 10, and this space has four separate segments kuseg 150, kseg0 152, kseg1 153 and kseg2 154. The kuseg 150 segment for the kernel mode is 2-GByte in size, coincident with the "kuseg" of the user mode, so when in the kernel mode the processor treats references to this segment just like user mode references, thus streamlining kernel access to user data. The kuseg 150 is used to hold user code and data, but the operating system often needs to reference this same code or data. The kseg0 area 152 is a 512-MByte kernel physical address space direct-mapped onto the first 512-MBytes of physical address space, and is cached but does not use the TLB 83; this segment is used for kernel executable code and some kernel data, and is represented by the area 143 of FIG. 9 in local memory 16. The kseg1 area 153 is also directly mapped into the first 512-MByte of physical address space, the same as kseg0, and is uncached and uses no TLB entries. Kseg1 differs from kseg0 only in that it is uncached. Kseg1 is used by the operating system for I/O registers, ROM code and disk buffers, and so corresponds to areas 147 and 149 of the physical map of FIG. 9. The kseg2 area 154 is a 1-GByte space which, like kuseg, uses TLB 83 entries to map virtual addresses to arbitrary physical ones, with or without caching. This kseg2 area differs from the kuseg area 150 only in that it is not accessibl in the user mode, but instead only in the kernel mode. The operating system uses kseg2 for stacks and per-process data that must remap on context switches, for user page tables (memory map), and for some dynamically-allocated data areas. Kseg2 allows selective caching and mapping on a per page basis, rather than requiring an all-or-nothing approach.

Figure 11:
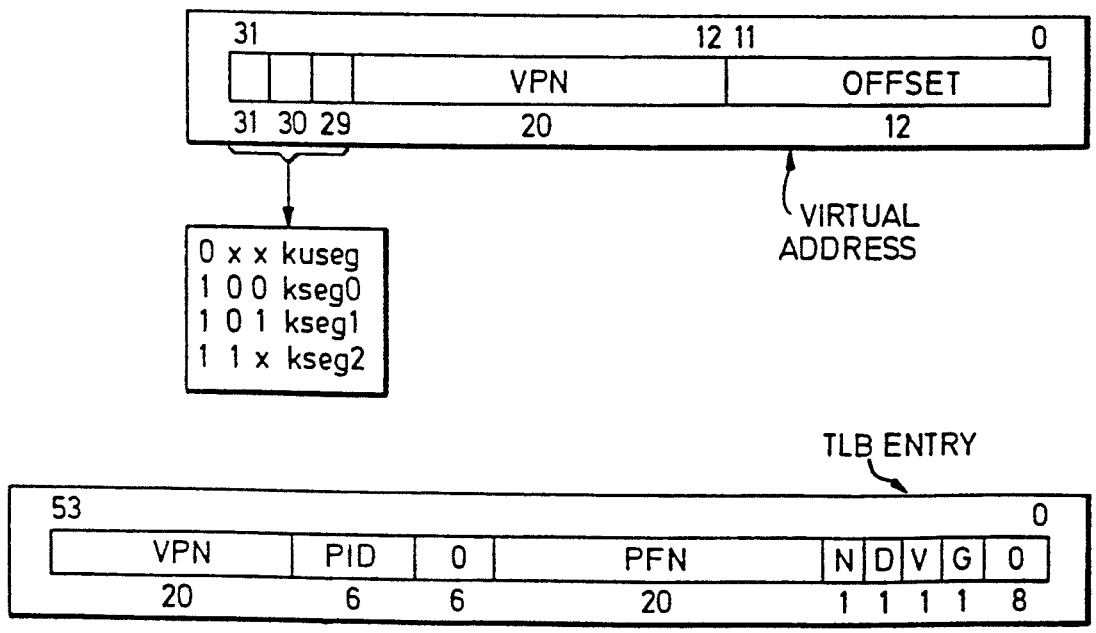
FIG. 11 is a diagram of the format of the virtual address and the TLB entries in the microprocessor chips in the CPU according to FIG. 2 or 3.

The 32-bit virtual addresses generated in the registers 76 or PC 80 of the microprocessor chip and output on the bus 84 are represented in FIG. 11, where it is seen that bits 0-11 are the offset used unconditionally as the low-order 12-bits of the address on bus 42 of FIG. 3, while bits 12-31 are the VPN or virtual page number in which bits 29-31 select between kuseg, kseg0, kseg1 and kseg2. The process identifier PID for the currently-executing process is stored in a register also accessible by the TLB. The 64-bit TLB entries are represented in FIG. 11 as well, where it is seen that the 20-bit VPN from the virtual address is compared to the 20-bit VPN field located in bits 44-63 of the 64-bit entry, while at the same time the PID is compared to bits 38-43; if a match is found in any of the sixty-four 64-bit TLB entries, the page frame number PFN at bits 12-31 of the matched entry is used as the output via busses 82 and 42 of FIG. 3 (assuming other criteria are met). Other one-bit values in a TLB entry include N, D, V and G. N is the non-cachable indicator, and if set the page is non-cachable and the processor directly accesses local memory or global memory instead of first accessing the cache 44 or 45. D is a write-protect bit, and if set means that the location is "dirty" and therefore writable, but if zero a write operation causes a trap. The V bit means valid if set, and allows the TLB entries to be cleared by merely resetting the valid bits; this V bit is used in the page-swapping arrangement of this system to indicate whether a page is in local or global memory. The G bit is to allow global accesses which ignore the PID match requirement for a valid TLB translation; in kseg2 this allows the kernel to access all mapped data without regard for PID.

The device controllers 30 cannot do DMA into local memory 16 directly, and so the global memory is used as a staging area for DMA type block transfers, typically from disk 148 or the like. The CPUs can perform operations directly at the controllers 30, to initiate or actually control operations by the controllers (i.e., programmed I/O), but the controllers 30 cannot do DMA except to global memory; the controllers 30 can become the bus (bus 28) master and through the I/O processor 26 or 27 do reads or writes directly to global memory in the memory modules 14 and 15.

Page swapping between global and local memories (and disk) is initiated either by a page fault or by an aging process. A page fault occurs when a process is executing and attempts to execute from or access a page that is in global memory or on disk; the TLB 83 will show a miss and a trap will result, so low level trap code in the kernel will show the location of the page, and a routine will be entered to initiate a page swap. If the page needed is in global memory, a series of commands are sent to the DMA controller 74 to write the least-recently-used page from local memory to global memory and to read the needed page from global to local. If the page is on disk, commands and addresses (sectors) are written to the controller 30 from the CPU to go to disk and acquire the page, then the process which made the memory reference is suspended. When the disk controller has found the data and is ready to send it, an interrupt is signalled which will be used by the memory modules (not reaching the CPUs) to allow the disk controller to begin a DMA to global memory to write the page into global memory, and when finished the CPU is interrupted to begin a block transfer under control of DMA controller 74 to swap a least used page from local to global and read the needed page to local. Then, the original process is made runnable again, state is restored, and the original memory reference will again occur, finding the needed page in local memory. The other mechanism to initiate page swapping is an aging routine by which the operating system periodically goes through the pages in local memory marking them as to whether or not each page has been used recently, and those that have not are subject to be pushed out to global memory. A task switch does not itself initiate page swapping, but instead as the new task begins to produce page faults pages will be swapped as needed, and the candidates for swapping out are those not recently used.

If a memory reference is made and a TLB miss is shown, but the page table lookup resulting from the TLB miss exception shows the page is in local memory, then a TLB entry is made to show this page to be in local memory. That is, the process takes an exception when the TLB miss occurs, goes to the page tables (in the kernel data section), finds the table entry, writes to TLB, then the process is allowed to proceed. But if the memory reference shows a TLB miss, and the page tables show the corresponding physical address is in global memory (over 8M physical address), the TLB entry is made for this page, and when the process resumes it will find the page entry in the TLB as before; yet another exception is taken because the valid bit will be zero, indicating the page is physically not in local memory, so this time the exception will enter a routine to swap the page from global to local and validate the TLB entry, so execution can then proceed. In the third situation, if the page tables show address for the memory reference is on disk, not in local or global memory, then the system operates as indicated above, i.e., the process is put off the run queue and put in the sleep queue, a disk request is made, and when the disk has transferred the page to global memory and signalled a command-complete interrupt, then the page is swapped from global to local, and the TLB updated, then the process can execute again.

Figure 12:
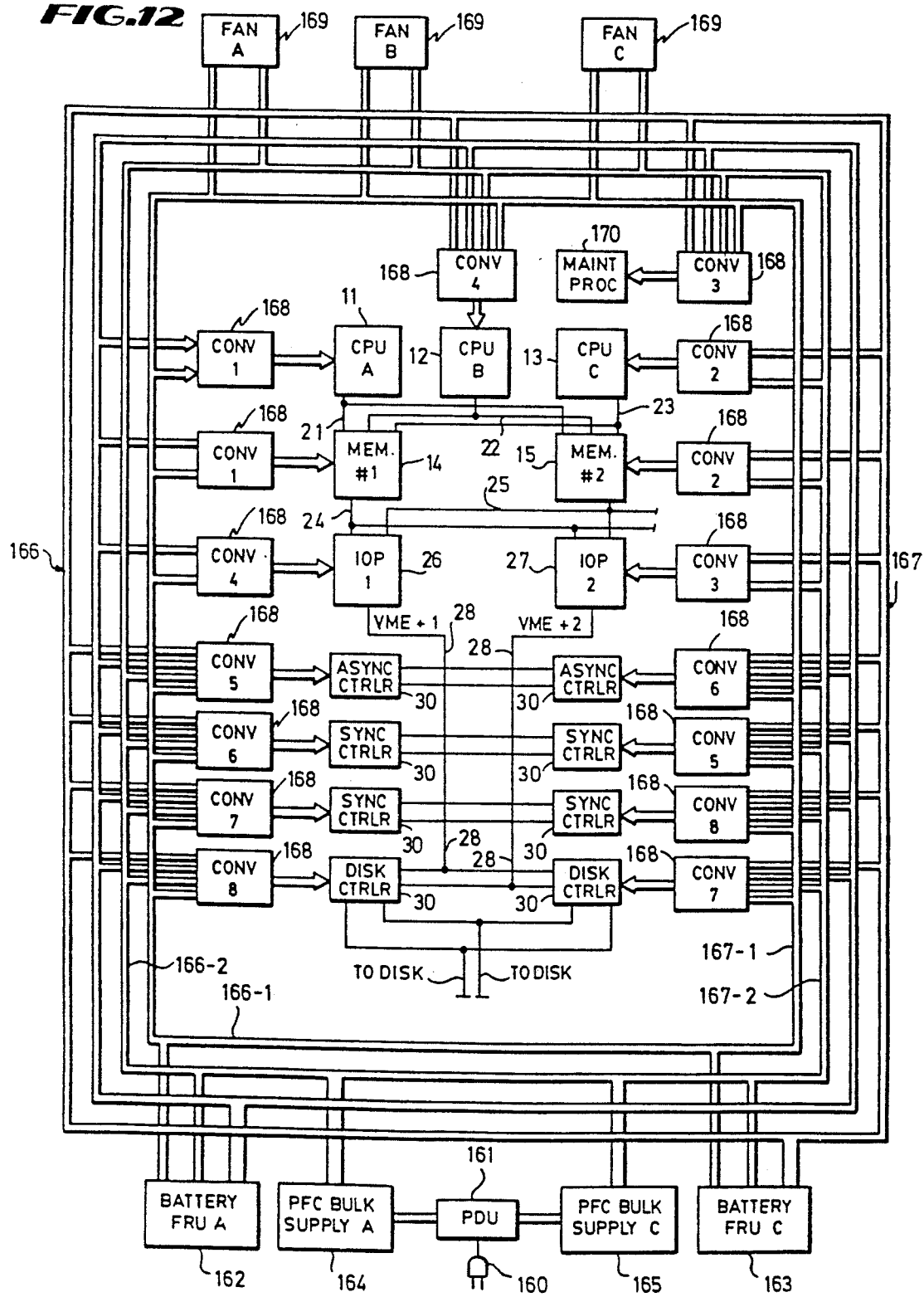
FIG. 12 is an electrical diagram in block form of a fault-tolerant power subsystem according to one embodiment of the invention.

Fault-Tolerant Power Subsystem:

Referring now to FIG. 12, the system of the preferred embodiment may use a fault-tolerant power subsystem which provides the capability for on-line replacement of failed power supply modules, as well as on-line replacement of CPU modules, memory modules, I/O processor modules, I/O controllers and disk modules as discussed above. In the circuit of FIG. 12, an a/c power line 160 is connected directly to a power distribution unit 161 that provides power line filtering, transient suppressors, and a circuit breaker to protect against short circuits. To protect against a/c power line failure, redundant battery packs 162 and 163 provide sufficient (e.g., about 4½ minutes in one embodiment) of system power so that orderly system shutdown can be accomplished. Only one of the two battery packs 162 or 163 is required to be operative to safely shut the system down.

The power subsystem has two identical AC to DC bulk power supplies 164 and 165 which exhibit high power factor and energize a pair of 36-volt DC distribution busses 166 and 167. The system can remain operational with one of the bulk power supplies 164 or 165 operational.

Four separate power distribution busses are included in these busses 166 and 167. The bulk supply 164 drives a power bus 166-1, 167-1, while the bulk supply 165 drives power bus 166-2, 167-2. The battery pack 162 drives bus 166-3, 167-3, and is itself recharged from both 166-1 and 166-2. The battery pack 163 drives bus 166-3, 167-3 and is recharged from busses 166-1 and 167-2. The three CPUs 11, 12 and 13 are driven from different combinations of these four distribution busses.

A number of DC-to-DC converters 168 connected to these 36-v busses 166 and 167 are used to individually power the CPU modules 11, 12 and 13, the memory modules 14 and 15, the I/O processors 26 and 27, and the I/O controllers 30. The bulk power supplies 164 and 165 also power the three system fans 169, and battery chargers for the battery packs 162 and 163. By having these separate DC-to-DC converters for each system component, failure of one converter does not result in system shutdown, but instead the system will continue under one of its failure recovery modes discussed above, and the failed power supply component can be replaced while the system is operating.

The power system can be shut down by either a manual switch (with standby and off functions) or under software control from a maintenance and diagnostic processor 170 which automatically defaults to the power-on state in the event of a maintenance and diagnostic power failure.

Powerfail/Autorestart:

According to a primary feature of this invention, the system described above is provided with a powerfail and autorestart procedure, to shut down the system in an orderly fashion upon power failure and automatically restart it when power is restored. The powerfail-/autorestart procedure provides a level of transparency, in regard to the loss of AC power, to the system of FIG. 1. This transparency is provided to the file system, application processes, and hardware devices. The intent is that the system will resume operation following the power failure, as if the power failure had not occurred. The powerfail/autorestart procedure provides a mechanism whereby the system may be gracefully quiesced and restarted.

The powerfail/autorestart procedure allows all applications to save state that may be resumed when power is restored. As noted above, the procedure requires the battery back-up 162, 163 to provide system power for a length of time needed to execute an orderly shutdown with the saving of state. By default, applications are not cognizant of the loss of power to the system. In order to allow for the saving of essential state, and later resumption on power restoration, the application must be configured to receive notification from the powerfail-/autorestart procedure. Applications so configured may enhance the level of transparency to power loss, and recover from the time-latency intransparency already discussed.

Referring to FIG. 13, a time line of a shutdown and restart procedure is illustrated. The CPUs 11, 12 and 13 are executing an instruction stream in normal operation during a time 171, and an AC power failure occurs at time 172. This power failure is signalled by the maintenance processor 170 to the CPUs 11, 12 and 13 as an interrupt, but shutdown is not immediately initiated; instead, to filter out transients, a time delay is introduced for an interval 173, after which a powerfail signal is generated by the CPUs at time 174. The shutdown process continues during a time period 175 to completion at a time 176, and if during this time the AC power has been restored the restart procedure will begin immediately at time 176. The restart procedure continues during a time period 177 to completion at time 178, as will be described. Normal operation continues during time period 179, executing the instruction stream as before shutdown during time period 171.

When the maintenance processor 170 of the power supply circuitry of FIG. 8 senses a power failure, an interrupt is received by the CPUs 11, 12 and 13 that is handled by the operating system. This occurs at the time 172 of the "powerfail indication", and the shutdown procedure will not be initiated until the "powerfail confirmation" time 174. To rule out transient power failures, the CPU will wait a specified period of time 173 before proceeding with the shutdown. During this waiting period 173, the system will continue to function normally, executing the instruction stream as in the period 171. If the power failure persists, the operating system will confirm the power failure and proceed with the shutdown procedure.

The shutdown procedure is bounded in time between the powerfail confirmation 174 and the time that the batteries 162 and 163 can no longer reliably operate, which may be 4½ minutes in the example given above; i.e., the shutdown time cannot be longer than 4½ minutes and should be much shorter—the length will depend upon the amount of volatile memory to be copied to nonvolatile memory and the number of processes running at the time that must have state saved. During this shutdown time period 175 the active processes and device drivers will be given a warning of the impending shutdown so that they can perform any preparations necessary. Then process execution will be suspended and the state of device controllers saved. Devices not involved in the saving of system state (e.g., displays, etc.) will be powered down as soon as possible after the time 174 to minimize the power drain on the battery supplies 162 and 163. The volatile state of the kernel, processes, and device drivers will be saved to nonvolatile storage, e.g., disk 148. Finally, the battery supplies 162 and 163 will be sent a message to turn off.

When power is restored, e.g., at time 176, the system will initiate a boot sequence that differs from the norm. The normal boot procedure is automatically initiated and followed until some later stage of the bootloader checks the powerfail information in nonvolatile storage to determine if this is a normal boot or a power failure restart. In the case of a power failure restart, the essential system state is restored from nonvolatile storage rather than reloading a fresh copy of the operating system. Processes and device drivers are allowed the opportunity to perform any procedures necessary to restart their particular application or operation.

The "essential system state", or "essential system image" (the terms are used interchangeably), consists of the volatile state of the kernel, user processes, and hardware devices. The essential system state is written to disk 148 during the powerfail shutdown. More accurately, a portion of the essential system state is written to disk. The remainder of the essential system state is already on the disk, and, as such, does not need to be written out. For example, the swap file contains portions of the executable images of processes that have been paged out; and, some file buffers for open files have been already flushed to disk.

The occurrence of a shutdown/restart cycle is transparent to many applications, but not to others. For example, if data communications sessions are established at the time of the shutdown, it is highly unlikely that the sessions will survive the shutdown/restart cycle; sessions will likely timeout and need to be reestablished. The communications controller may need to rely on some higher layer software to reestablish the communications sessions. The powerfail/autorestart procedure allows the higher layers of the software the opportunity to perform this level of recovery. A certain amount of robustness is inherent in communications protocols to handle loss of routers, packets, etc. The application may need to enhance this robustness if the shutdown/restart cycle must be transparent to its client. Any applications that are distributed in some manner across multiple processors must take advantage of the powerfail/autorestart procedure in order to supply such transparency to its users.

The occurrence of a shutdown/restart cycle may not be transparent even to a device directly attached to the local machine. For example, tape units that are rewinding may have the operation aborted. The process that requested this operation would then receive an operation failed error. In general, the shutdown/restart cycle is not transparent to any device (or process using that device) that does not stay powered up and available during the shutdown procedure time interval 175.

File System State:

The heavily cached copy-back file system incorporated in Unix would ordinarily be expected to exhibit a lack of data integrity in the presence of system shutdown, through power failure or otherwise. A feature of the powerfail/autorestart procedure is to minimize this characteristic weakness by synchronizing the in-memory data (in local memory 16 and global memory 14, 15) with the corresponding image on disk 148.

The powerfail/autorestart procedure accomplishes this task in two ways. When the power failure is confirmed at time 174, no further delayed writes are allowed during the time 175 of the powerfail shutdown procedure, and of course all then-pending delayed writes from normal operation period 171 are executed. A "delayed" write is a disk write operation issued by an application that is held in memory for an undetermined period of time, to provide the appearance of a higher performance file system than actually exists. Since all application writes are forced to disk, the file system is kept in a synchronized state.

Also, at the time 174 of powerfail confirmation, the file system is synchronized to disk by immediately issuing all pending delayed write operations. Thus, the file system will remain synchronized as the system is gracefully quiesced and devices and processes are notified during the period 175.

Interaction between the file system and the powerfail/autorestart procedure involves the dirty file system buffers. The powerfail/autorestart procedure insures the integrity of the file system regardless of the settings of the kernel parameters chosen by the system administrator.

During the shutdown procedure, the file system dirty buffers are saved into the file system. Actually, at the time of the powerfail confirmation 174, a call is made to a routine to commence the file system synchronization. After that call, all delayed writes are forced into asynchronous writes. Later, the shutdown procedure will delay to insure that all dirty blocks have been flushed prior to the writing of the essential system image. A "delayed write" is one in which the block is not written to disk until the file system has need of any empty block and chooses this dirty block. Also, periodic file system "syncs" are done by the operating system to flush all dirty blacks. An "asynchronous write" is one in which the write is issued immediately to the disk driver. The reason for the term "asynchronous" is that the operating system will issue the request, but will not wait for its completion.

The time taken to perform this "synch" could be longer than the batteries 162 or 163 will support, a situation to be avoided. To this end, the disk device driver uses a head scheduling algorithm to insure that seek time between buffers on a given disk does not approach the average seek time for that disk. This can be accomplished by ordering the buffer writes in sequence by position on the disk.

Process State:

The powerfail/autorestart procedure notifies processes regarding the presence and the progress of the powerfail shutdown via UNIX ® signals. In particular, the SIGPWR signal is utilized for this purpose. The powerfail/autorestart procedure has expanded the signal concept to include a "code" that is delivered to the process. Normally, Unix processes receive a signal number only, denoting the particular signal being delivered.

Referring to FIG. 13, the Unix processes executing during the time 171 may be configured in one of two manners, i.e., either "kill on powerfail" or not. Each process has a "kill on powerfail" attribute that, when set, modifies the signals that are sent during the powerfail shutdown process period 175. A process marked as "kill on powerfail" is not intended to service the shutdown, although such a process may perform cleanup operations before its termination.

Additionally, processes are configured by default to "ignore" the SIGPWR signal. Such processes will not be aware that a power failure has occurred, unless the "kill on powerfail" attribute is set.

After the power failure has been confirmed at time 174, all processes are sent a signal at time 181. Processes marked as "kill on powerfail" receive the SIGTERM signal with a code of PFQUIESCE. Other processes are sent a SIGPWR signal with a code of PFQUIESCE. Some processes may ignore these signals. Note that processes which do not ignore these signals may perform some cleanup activity as required for the particular application at hand.

After an administrator-configurable interval, processes marked for "kill on powerfail" are sent the SIGKILL signal at time 182, which cannot be ignored. All other processes are suspended from execution.

The memory image of all processes is now saved in nonvolatile storage during a time 183. In certain implementations of the powerfail/autorestart procedure, this nonvolatile storage is the disk 148. Thus, the memory image in local or global memory is written to the disk 148. In other implementations, the memory boards 14 and 15 or auxiliary memory boards not shown may be battery backed up, and thus constitute nonvolatile storage.

Upon power restoration, after time 176 in the restart process, the memory image of the processes is restored during the period 177. Processes receive a SIGPWR signal with a code of PFRESTART indicating that the powerfail recovery is complete. If the process needs to restart or restore information that was achieved during the shutdown procedure, it may do so now.

Thus, a process may selectively interact with the powerfail/autorestart procedure. By default, processes are not aware that a shutdown/restart cycle occurred; however, a process may make itself aware of the occurrence of either the shutdown and/or the restart. References to processes herein generally are to user processes, and not system processes. System processes do not receive any special powerfail/autorestart handling, with the exception of Init which will execute the /etc/pfshutdown or /etc/pfrestart shell script during shutdown or restart, respectively, upon receipt of the SIGPWR signal. No other system processes receive signals.

The system administrator may select certain processes to be killed during shutdown, regardless of whether "resume on restart" or "reboot on restart" was selected. When "reboot on restart" is selected, all processes are marked as "kill on powerfail" by default. Processes go through one of two logical paths during shutdown based on the disposition of the "kill on powerfail" property. After the power failure has been confirmed, processes which have been marked as "kill on powerfail" will receive the SIGTERM signal. Processes not so marked will receive the SIGPWR signal. The signal handlers accept three parameters: the signal number, a code, and a pointer to a sigcontext structure.

Processes not marked for kill on powerfail will be considered first; these processes receive the SIGPWR signal, and are not marked as "kill on powerfail". The handler for the SIGPWR signal should perform any process-specific procedures at this point. The code will be set to PFQUIESCE to differentiate this delivery of the SIGPWR signal from that given during the restart procedure. When the process has completed its process specific procedures, it should suspend further execution by calling a pause utility. This process will then resume execution returning from pause when SIGPWR with a code of PFRESTART is delivered during the restart procedure.

After the SIGPWR handlers have been allowed to execute, all processes ready to execute will be suspended by removing them from the run queue (actually, processes may be left on the run queue but the scheduler may not schedule any processes for further execution). Processes that have suspended awaiting some event have already left the ready state and will, of course, not be considered for execution either. Forcibly suspended processes will not be aware of the mechanism used by the kernel to either suspend or resume their execution, just as processes are unaware of clock interrupts that occur during their execution.

Processes marked for kill on powerfail will now be considered, i.e., the processes which receive the SIGTERM signal with a code of PFQUIESCE, those marked as "kill on powerfail". The code of PFQUIESCE signifies to the process that this signal delivery is related to a power failure and not some other source. The straightforward thing for such a process to do is to cleanup and terminate. After the SIGTERM handlers have been allowed to execute, the SIGKILL signal will be posted to all such processes.

Considering now processes during the restart procedure 177, only those of the "resume on restart" type are applicable. If "reboot on restart" was chosen, of course, processes which were in existence during the shutdown will not exist, as the system is rebooted with a fresh copy of the operating system.

During the restart procedure, all processes will also receive the SIGPWR signal. The /etc/pfrestart script is executed for an administrator-configurable period of time prior to the delivery of SIGPWR to all user processes. The mechanism for executing the /etc/pfrestart script is delivery of SIGPWR with a code of PFRESTART. The SIGPWR handler will receive a code of PFRESTART, which may be used to differentiate between the SIGPWR signal delivered at shutdown and that delivered at restart. On restart, the handler may initiate such actions as may be germane to the application at hand. This may include such things as refreshing the terminal screen or rolling back any database transactions that were in progress.

Init process handling:

The Unix "init" process receives special handling during the powerfail and shutdown procedures. Init is configured to scan the "/etc/inittab" file and execute POWERFAIL or POWERWAIT actions upon receipt of the SIGPWR signal (just prior to time 181) with codes of PFQUIESCE and PFRESTART, respectively. In this way, the administrator may configure shell scripts which will assist in customizing the shutdown or restart to the particular applications at hand.

The init process receives the SIGPWR signal at an administrator-configurable interval prior to all other processes, whether during the shutdown procedure or the restart procedure. This allows the shell scripts to perform functions that may be adversely affected by the additional cleanup activity incurred as the other processes receive the signals.

Device State:

Devices such as the I/O processors 26 and 27, like processes, are given opportunity to save and restore state. The device state, like process state, is saved in nonvolatile storage 148 for restoration during the powerfail restart. Devices, however, receive a finer granularity in the notification of the progress of the shutdown or restart. Each device is configured with a "powerfail routine". This routine is called with various codes, signifying the action to be taken.

At the time 174 of powerfail confirmation, the device powerfail routine is called with a code of PFCONFIRM of FIG. 13. The device performs any action that is appropriate.

After process execution is halted or "kill on powerfail" processes are killed, the devices are called with a code of PFHALT at time 184. This code indicates that process execution has halted. In particular, the disk driver may infer that no more reads need be processed. All in-progress reads may be queued for resumption during the restart procedure.

Then the device powerfail routine is called with a code of PFQUIESCE at time 185. The device returns from this routine call, the size in bytes of the state to be saved. The powerfail/autorestart procedure then insures that space is reserved in nonvolatile storage equal to this amount for this particular device.

The next call is done with a code of PFDUMP, and an argument which is the address of the save area reserved as described in the previous paragraph. The device is responsible of recopying its state information into the save area. The powerfail/autorestart procedure will then insure the safety of this data.

When power is restored, the device drivers will receive the standard device identification call as received during a normal boot sequence. The powerfail/autorestart procedure uses the information received from this routine to verify that the hardware device configuration has not been modified during the power outage interval.

The device powerfail routines are called with a code of PFINIT. This call is intended to inform the disk driver that it must perform any requisite initializations to restore that part of the essential system state which is stored on the disk.

Then, sequentially for each device, the nonvolatile saved device state is brought into a memory buffer, and the device powerfail routine is called with a code of PFRESTORE and an argument of the address of the memory buffer.

Finally, the device powerfail routine is called with an argument of PFRESTART, indicating that the device may commence normal operation.

Thus, device drivers, like processes, may have state that needs to be saved across the shutdown/restart cycle. This is more likely to be the case with intelligent controllers. Like processes, the powerfail/autorestart procedure allows each controller to selectively react to the shutdown/restart.

The device drivers that control physical devices must have a powerfail routine. Communication between the kernel and the device drivers regarding the shutdown/restart will be done by calling this routine. In order to provide for optimal scheduling of writes to nonvolatile storage, effort is made to stage device drivers for the flushing of the file system buffer pool, saving kernel memory, and saving device state.

At the time 174 of powerfail confirmation, the powerfail routine of the driver for each device will be called with a command parameter of PFCONFIRM. This is to give indication to the driver that it must prepare to shutdown. For example, an intelligent network controller (that contains code for the session layer) may use this indication to abort or semigracefully close outstanding connections while refusing new connections.

When all process execution is suspended, a second call is made to the powerfail routine of the driver for each device with a command parameter of PFHALT at time 184. The purpose of this call is to indicate to the disk driver that no further reads will be done. All pending reads should be discontinued until the restart procedure. PFHALT is only meaningful to the disk driver, all other drivers will receive it, but need not perform any activity.

Then at time 185 a third call will be made to the device powerfail routine with a parameter of PFQUIESCE. The purpose of this call is to indicate that all cleanup activity carried out by the device should now be complete, and no further such activity attempted. In fact, the device should not modify kernel/user memory other than to perform the dump operation described in the next paragraph. For example, no calls to kern_malloc or kern_free should be made after PFQUIESCE. This is because the essential system image is being written to PFDEV, a non-volatile storage area for the essential system. The return value from this call is an indication of the amount of save area that should be allocated for this device in the essential system state saved into PFDEV. A return value of zero implies that no save area is necessary.

The I/O processor state is saved at this point so that the device state as represented in the access validation ram (AVRAM) is properly captured. This AVRAM state is written to PFDEV as a part of the essential system state.

Finally, when a save area was requested by the driver for the device, a fourth call will be made to powerfail with a command parameter of PFDUMP and an argument parameter of the address of the save area in which to dump the device state (as requested by the PFQUIESCE call). The device driver is then responsible for copying its state information into the save area before returning from this call. The format of the information in the save area is device specific and not defined by the kernel, other than overhead information in the save area is device specific and not defined by the kernel, other than overhead information kept by the kernel to identify this area. Drivers for devices which do not contain powerfail partitions aliased by PFDEV should power down their device following completion of the PFDUMP call.

The disk driver is used to write the device dumps to PFDEV. Therefore, the disk driver cannot dump its own state, because this state would need to be read from disk and restored in order to allow the disk to be initially read. The disk driver, because of its critical role, must be handled specially during shutdown, and restart as well.

Certain device drivers may want to make special cases of the two types of shutdown procedure that can occur, "resume on restart" or "reboot on restart". Device dumps are not actually written to disk if the restart type is "reboot on restart", as this state information will not be necessary to the reboot. However, the device driver is not cognizant of this fact. That is, the interaction between restart procedure and the device driver is identical for both "reboot on restart" and "resume on restart". A device driver may determine the type of shutdown in progress by examining a data structure which is accessible in the device driver's address space. The values of the flags indicating the current settings of the kernel powerfail/autorestart procedure switches, as well as the numeric parameters, are included in a file "sys/rolex/pwrfail.h".

Device drivers during restart will now be considered. Device state is restored only for devices designated "resume on restart". If "reboot on restart" was chosen, of course, device state which was in existence during the shutdown will not be restored, as the system is rebooted with a fresh copy of the operating system.

First, the I/O processor state is restored. This state includes the access validation RAM information that represents a portion of the device state. Then the device identification routine is called for each device. Then, the powerfail routine of the driver for each device will be called with a command of PFINIT. This call is intended for the disk driver for disk 148 only. All other drivers may ignore it. At this point, the disk driver initializes itself so the device state for the other device drivers may be read in off the powerfail dump device, PFDEV. Next, the powerfail routine of the driver for each device will be called with a command of PFRESTORE and an argument of the address of the save area requested by the device during shutdown. If no save area was requested for this device by the driver, the argument will be NULL. This call to the powerfail routine is to reload any state information.

It is important that the device driver merely recapture the state that was saved during shutdown, when the PFRESTORE command is used. The device driver must not make any state transitions beyond the saved state until the PFRESTART command is issued. Successive restart/shutdown/restart cycles may require that the PFRESTORE command be issued multiple times, and thus this operation must be idempotent. When all devices have been restored, the powerfail routine will be called again with an argument of PFRESTART. Note that the powerfail routine is called with a command of PFRESTART in lieu of calling the init routine of the device driver, during the restart procedure. At this point the device may resume normal operation, and make state transitions beyond that saved in the shutdown procedure.

For devices that have no need to save state during shutdown, the PFRESTORE call to the powerfail routine may be ignored. Then the PFRESTART powerfail routine call may be used to reinitialize the device to resume operation. In any case it is important that device operations which may cause state transitions in a nonidempotent manner be performed following PFRESTART and not before that time.

Since the disk driver is used to read in the saved device state from PFDEV, the disk driver cannot save or restore its own state. When the PFRESTORE call is made the disk driver must perform any initialization that is required in order that PFDEV be read and written from. For the disk driver, the PFRESTART call will only signify that the reads which were discontinued at PFHALT may now be continued.

It is important to note that drivers can experience two types of powerfail/autorestart procedure restarts. The first type is the when the system actually loses power. All controllers and devices will have experienced a reset prior to the autorestart procedure. The second type occurs either on a forced shutdown, or a transient power failure where AC power returns during the shutdown procedure. This second type is termed a "fall through" restart. In this case, disk devices which contain powerfail partitions aliased by PFDEV will not have experienced a reset. The call made to the device powerfail routine with an argument of PFINIT may then be used to properly reset the device in preparation for the powerfail restart.

Atomicity and Idempotency:

The characteristics of atomicity and idempotency concern the action taken in the presence of restoration of power in the midst of a shutdown, or subsequent power failure during the restart procedure.

The shutdown and restart procedures are of sufficient duration (the time periods 175 and 177 of FIG. 13) that it is possible that one may attempt to overlap the other; e.g., power may be restored before the shutdown procedure has completed, even though the delay 173 is introduced to rule out short transients in the supply of power. If the shutdown procedure of time period 175 does not complete before power is restored to the system, the shutdown procedure will run to completion anyhow. The restart procedure is then immediately initiated at time 176, independent of any operator interaction. The user may see a longer delay in the response of the system using this procedure, but the complicated procedure from powerfail confirmation at 174 until completion at 176 is an atomic event, and will run to completion once initiated.

The shutdown procedure is thus "atomic" in the sense that once initiated, it will run to completion even if AC power is restored to the system during the time period 175 while the shutdown is running. However, at the end of the shutdown procedure, at time 176, if AC power has returned, the restart procedure will be initiated immediately. Otherwise, the powerfail/autorestart procedure will turn the batteries off and the system will need a powerup reset to restart via the boot ROMs.

Another likely scenario is that power may fail in the midst of the restart procedure during the time 177. The restart procedure is also atomic in nature, although different from the shutdown procedure. The restart procedure may be "rewound" and initiated again at any point prior to which the state of the restarted system deviates from the essential system image stored on nonvolatile media. The essential system image may be reloaded into memory several times without causing damage. However, as soon as process execution is enabled and device activity started, the state of the system has transitioned beyond the stored essential system image.

The restart procedure is thus divided into two parts. A nonatomic, idempotent portion 187 prior to the execution of any processes or state change on any device controllers, and an atomic portion 188 when process execution and device activity is restarted. If a commitment has not been made to resume process execution and device activity, the presence of a powerfail indication will not require a shutdown phase 175, but merely a wait for stable AC power to be restored. Powerfail indication 172 and not confirmation 174 is the important point here because powerfail indication during the nonatomic portions 187 of the restart procedure will cause yet another wait for the determination of stable AC power. Once a commitment has been made to resume process execution and device activity, all devices must be restarted and then all process execution resumed, even in the presence of a powerfail confirmation 174. If a confirmed power failure occurs when the restart has completed the atomic action of resuming process execution and device activity, a full shutdown cycle will occur.

The occurrence of a powerfail confirmation 174 during the atomic resumption of process execution and device activity during restart period 177, and the ensuing initiation of a shutdown procedure (period 175 reinstituted) may shorten the total time the battery supply 162 can supply power during the shutdown procedure. It is important that the process/device driver restart interval be as short as possible to avoid the impact of this limitation on an immediately recurring shutdown procedure.

During the idempotent portion 187 of the restart procedure, a power failure will cause the system to immediately lose power, necessitating a powerup reset as mentioned previously. Thus, if the AC power is unstable, the idempotent portion 1xx of the restart procedure may be executed several times before the system is actually restarted. After a power failure, but with AC power restored by the time of completion of the shutdown procedure, the restart procedure begins immediately then is truncated when a second power failure occurs during the idempotent portion.

The atomic portion of the restart procedure is entered following the idempotent portion, at a "commit" point 186. When the commit point is reached, the restart procedure will run to completion even in the presence of a power failure. At the end of the restart procedure, if a power failure persists, the shutdown procedure will be entered.

The "commit" point thus divides the restart procedure into the two halves, the first being the idempotent portion 187 and the second being the atomic portion 188. The commit point 186 occurs after each device has received the call with a code of PFRESTORE. The powerfail/autorestart procedure then waits an administrator-configurable time interval to confirm that AC power is stable, and then "commits" to complete the restart. Note that since the AC power confirmation interval logically lies in the idempotent portion of the restart procedure, a power failure during this time will again wait for a powerup reset as aforementioned.

System Administrator:

The system administrator's access to the powerfail/autorestart procedure includes the setting of parameters in the kernel, forcing a system shutdown on demand, shell scripts run at shutdown and restart, selectively setting a per process "kill on powerfail" property, the creation of the aliased powerfail dump device (PFDEV) and its associated powerfail partitions, and hardware reconfiguration over the duration of a power failure.

The shutdown and restart procedures have certain kernel parameters accessible to the system administrator. For example, the administrator may select the "resume on restart" option, in which case the operation of the system is resumed essentially where it left off prior to the shutdown. The administrator may otherwise choose the "reboot on restart", which causes the operating system to be rebooted rather than resumed.

Other kernel parameters accessible to the system administrator include: (1) the time interval 173 between powerfail indication and powerfail confirmation (failtime), (2) a ceiling on the number of acceptable powerfail interrupts in the powerfail indication/confirmation interval 173 (intent), (3) the amount of time the battery supply can reliably function when fully charged (upstime), (4) the time interval between powerfail confirmation 174 when the "/etc/pfshutdown" shell script is executed, the time 181 of posting of SIGPWR (processes not possessing the "kill on powerfail" property) or SIGTERM (processes possessing the "kill on powerfail" property) to all user processes; and on restart, the time interval 190 between the execution of the "/etc/pfrestart" shell script and the posting of SIGPWR to all user processes (pwrtime), (5) the time interval between the posting at 181 of SIGPWR (processes not possessing the "kill on pwerfail" property) or SIGTERM (processes possessing the "kill on powerfail" property) to all user processes and suspension of process execution (all processes not possessing the "kill on powerfail" property) or posting at 182 of SIGKILL (all processes possessing the "kill on powerfail" property) to all user processes (termtime), (6) the action to perform when the battery supply 162, 163 cannot reliably support the duration of a full shutdown procedure (shutact), (7) the amount of time AC power must be restored and stable before initiating the restart procedure (actime), and (7) the action to perform during the boot procedure when it is evident that the battery supply could not support a full shutdown procedure because the batteries have been drained and need recharging (resact).

The system administrator may force a shutdown process, without the occurrence of a power failure, to load the batteries and insure that they are operational. Forced shutdowns may be done as a part of the administrative routine on a regular interval to insure the reliability of the battery supply. A system call is provided to force a shutdown in a manner similar to that which occurs at the time of a power failure. The differences between a forced shutdown procedure and an actual powerfail confirmation initiated shutdown include the shutting off of the bulk power supplies, and the initiation of the restart procedure. A forced shutdown shuts off the bulk power supplies, to test the ability of the batteries to supply power. The type of restart procedure is always "resume on restart", if the shutdown as forced. Since the restart procedure will not be triggered by a powerup indication, the forced shutdown procedure software must initiate the restart procedure.

Site or application specific information may be included in one of two shell scripts, /etc/pfshutdown and /etc/pfrestart. The shutdown procedure will execute the /etc/pfshutdown script. The restart procedure executes the /etc/pfrestart script. In these scripts the administrator may perform such maintenance chores as killing all processes associated with a database management system during the shutdown procedure, and restarting the dbms during the restart procedure. These shell scripts are the primary mechanism for administrative tailoring of the functionality of the powerfail/autorestart procedure.

Disk System Considerations for Shutdown and Restart:

The disk system 148 contains the powerfail partitions that collectively form the nonvolatile storage area for the essential system image.

The essential system image consists of all process and kernel state that must be saved to allow the restart procedure to function properly. The process state includes the Unix area, data and stack pages, and possibly other information. The process table slot and other system data structure information associated with the process is part of the kernel state. Note that if the "reboot on restart" option is chosen, no essential system state is saved.

If an I/O error occurs when saving the essential system image into the PFDEV, the system will be set to "reboot on restart" regardless of the value of the kernel parameter which requests "resume on restart". The shutdown procedure will be aborted, and device and process state will be lost.

Upon restart, if the "reboot on restart" option is chosen, the disk system 148 will be involved in bringing a new copy of the operating system off from the disk. Rather than pursuing a normal boot when AC power is restored, the essential system image contained on PFDEV is loaded into memory 14, 15 or 16. This essential system image contains device state information which may be passed to a given device, as previously mentioned, and then discarded. The other portion of the essential system state consists of an actual core image, possibly in noncontiguous portions. If an I/O error occurs when restoring the essential system state, control is passed back to the initial boot sequence and a fresh copy of the operating system is loaded, regardless of the value of the kernel parameter which requests "resume on restart".

Battery OK signals:

Each battery which makes up the battery supplies 162 and 163 presents a "battery OK" signal via the processor 170 which may be monitored from the CPUs by polling, or through the interrupt that is generated by a transition in this signal. The powerfail/autorestart procedure interprets the battery OK signal presence as signifying that a full shutdown can be supported. The duration of a "Full" shutdown is defined by the system administrator. The absence of the battery OK signal is interpreted as implying that the battery cannot support a full shutdown without losing power to the machine as supplied by that battery, or damaging the battery through drastic discharge. For any given module, if a single battery presents the battery OK signal, the module can support a full shutdown. It is not necessary that both batteries 162 and 163 present "battery OK".

The powerfail/autorestart procedure makes use of the battery OK signals in several places. The battery recharge delay done during a normal boot or powerfail/autorestart, will wait until the battery OK signal is presented by at least one battery in each module. During the powerfail shutdown procedure, the shutdown may be aborted if the battery OK signal is not presented by at least one battery.

When AC power is restored, regardless of whether the "reboot on restart" or "resume on restart" option is chosen, a delay may be incurred prior to initiating the boot/resume. This delay allows the batteries 162, 163 to be sufficiently charged so that another power failure can be supported. That is, it is undesirable to bring the system back online when it cannot be execute another orderly shutdown because the batteries are low. The boot procedure will delay for a time interval, based on the amount of time that the shutdown procedure discharged the batteries and the settings of the kernel parameters. The shutdown procedure accumulates the battery discharge time since last recharge and stores this value in nonvolatile storage. The delay time for a full battery charge is, for example, sixty times the discharge time.

System memory organization:

When the core image portion of the essential system state is written to PFDEV, it is important that each write be as large as possible; it would be preferable to do this in one large write, but the architecture of the system does not allow this possibility. Therefore, it is essential that the global memory 14, 15 include a large "window" which contains no system data structures 144, only user data 145; of course, the larger the size of this "window" in global memory 14, 15, the faster the saving of the core image will be. Then the powerfail/autorestart procedure can write first the data in this "window" from global memory to disk 148. Then the rest of system memory (local and global) can be copied to the "window" in global memory, and from there written to disk 148. In particular, all allocation routines must be precluded from allocating a portion of memory to be used by system anywhere in this "window" which the powerfail/autorestart procedure will use in global memory. The majority of the code which will allocate data structures in global memory is related to the I/O subsystem, into order to accomplish DMA transfers and such.

Pseudo-code Functionality Summary

The pseudo-code listing set forth in Table A, along with the time line set forth in Table B and associated timing diagram of FIG. 13, illustrate the features of one embodiment of the invention as discussed above. The example "time line" of Table B is a typical shutdown and restart, including a single shutdown/restart cycle. This, of course, bypasses scenarios that develop in the presence of aborted and multiple restart attempts. The sequence of actions presented in the time line and FIG. 13 is significant. For example, process execution must be suspended prior to flushing the dirty file system buffers, which in turn must be done prior to quiescing and dumping device state. The times presented in the time line, represented in minutes and seconds, are for exemplary purposes only.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE A

PSEUDO-CODE LISTING FOR POWERFAIL/AUTORESTART PROCEDURE

Powerfail Confirmation

```
confirmation:
    while (NOT powerfail indication) {
        normal fault tolerant operation;
    }
    delay (failtime);
    Check bulk status;
    if (dual bulk failure in any given box OR
        power transitions on any given bulk > intcnt) {
        confirm power failure;
        go to shutdown procedure;
    } else {
        log transient power failure;
        go to confirmation;
    }
```

Shutdown procedure

```
shutdown_procedure 0
{
    mark pfdev invalid;
    set flag, no further delayed writes;
    call drivers with PFCONFIRM;
    send SIGPWR with code PFCONFIRM to init;
    /* init will run "/etc/pfshutdown" script */
    delay (pwrtime);
    if ("reboot on restart") {
        mark user processes for kill;
    }
    for (all user processes)
        if ("kill on powerfail") {
            send SIGTERM with code PFQUIESCE to process;
```

TABLE A-continued
PSEUDO-CODE LISTING FOR POWERFAIL/AUTORESTART PROCEDURE

```
    } else {
        send SIGPWR with code PFQUIESCE to process;
    }
    delay (termtime);
    for (all user processes)
        if ("kill on powerfail") {
            send SIGKILL;
        }
    suspend process execution;
    call drivers with PFHALT;
    insure that the file system is completely flushed;
    call drivers with PFQUIESCE;
    save the state of the callout table;
    save the IOP state;
    call drivers with PFDUMP and write device dump to disk;
    if ("reboot on restart") {
        validate pfdev header;
        go to cleanup;
    }
    write system memory to disk;
    write valid pfdev header;
    if (forced shutdown) {
        test batteries;
    }
cleanup:
    if (no ac power OR
        forced shutdown with load from disk option) {
        disable batteries;
        reboot system;
    }
}
Restart procedure
restart_procedure0
{
    /* idempotent portion */
    reinitialize callout table;
    restore IOP state;
    reidentify devices;
    while (some device reports config error) {
        query system console;
        if ("abort" response) {
            reboot system;
        } else if ("continue" response) {
            break out of while;
        }
    }
    call drivers with PFINIT;
    read pfdev header;
    if (error OR invalid header) {
        reboot system;
    }
    call drivers with PFRESTORE;
    while (some device reports config error) {
        query system console;
        if ("abort" response) {
            reboot system;
        } else if ("continue" response) {
            break out of while;
        }
    }
    if (resact configured to not recharge batteries) {
        continue;
    } else if (resact configured for maximum recharge) {
        delay (an amount dependent on the shutdown duration);
    } else {
        while (battery OK signal not present) {
            delay;
        }
    }
    /* nonidempotent portion-commit to restart */
    update pfdev header to show system image is now invalid;
    restore the callout table with shutdown snapshot;
    call drivers with PFRESTART;
    restart scheduling user processes;
    send SIGPWR with PFRESTART to init;
    /* init will run the "/etc/pfrestart" script */
    delay (pwrtime);
    send SIGPWR with code PFRESTART to all user processes;
}
```

TABLE B
SHUTDOWN AND RESTART TIMELINES

Sample shutdown timeline:
- 0:00 Powerfail indication at 172. Begin time interval 173 screening out spurious powerfail interrupts.
- 0:05 Powerfail confirmation at 174, power failure condition has persisted. Devices sent PFCONFIRM message. The /etc/pfshutdown script executed. Commence flushing dirty file system buffers. Force all further delayed writes into synchronous writes.
- 0:25 Processes not marked for kill on powerfail sent SIGPWR signal with PFQUIESCE message at 182. Processes marked for kill on powerfail sent SIGTERM signal with PFQUIESCE.
- 0:55 Processes marked for kill on powerfail sent SIGKILL signal.
- 0:57 Process execution suspended. Devices sent PFHALT message. Delay for file system flush completion.
- 1:00 Devices sent PFQUISCE/PFDUMP messages. I/O processor 26 and 27 state is saved. Essential device state is moved onto PFDEV.
- 1:05 Devices which do not contain powerfail partitions aliased by PFDEV are powered down. Commence saving of essential system state onto PFDEV.
- 3:30 Essential system state saved onto PFDEV. Write valid header to PFDEV. System shutdown complete. Remaining devices powered down. Battery supplies 162, 163 sent message to turn off batteries.
- 4:30 Battery supplies cease reliable operation if batteries are not turned off.

Sample restart timeline:
- 0:00 AC power restored. Begin time interval to insure AC power is stable.
- 1:00 AC power is stable. UPS indicates batteries at least minimally charged. System boots and begins loading essential system image.
- 1:30 IOPs state is restored. Devices are "id"ed, verifying device configuration. Device drivers receive PFINIT message. Device drivers receive PFRESTORE message. Essential device state is restored.
- 1:35 Commit to restart. Invalidate PFDEV header. Device drivers receive PFRESTART message. Process execution removed. /etc/pfrestart script is executed.
- 1:55 Processes receive SIGPWR signal with PFrestart argument.

---

What is claimed is:

1. A method of operating a computer system having a central unit (CPU), memory including volatile memory and non-volatile memory, a main power supply, a backup power supply, and a plurality of devices peripheral to said CPU said method comprising the steps of:

(a) executing processes in the central processing unit (CPU) from memory, while the main power supply provides power to said computer system;

(b) detecting a failure of said main power supply and, in response thereto, providing power to said computer system from the backup power supply and executing a shutdown procedure in said CPU, said shutdown procedure including first warning said processes of an impending shutdown of the computer system, said processes responding to said warning in a manner varying from process to process, and then copying state information of said computer system from said memory to said non-volatile storage, wherein said state information includes state information of the processes and state information of the devices;

(c) after completing said shutdown procedure, if said power supply has been restored, automatically initiating a restart procedure;

(d) said restart procedure including reading said stored state from said non-volatile storage and restarting said processes and continuing executing without rebooting;

(e) or, if said power supply has not been restored within a predetermined period of time after completion of said shutdown procedure, automatically shutting down said backup power and ceasing execution by said CPU.

2. A method according to claim 1 wherein said shutdown procedure is completed even though said power supply has been restored before the shutdown procedure is completed.

3. A method according to claim 1 wherein said system executes processes in said CPU which include delaying the writing of data to said non-volatile storage by storing said data in at least one delayed write memory block until an empty block is needed by a file system, and wherein said step of executing a shutdown procedure includes copying all of said data from said at least one delayed write memory block to said non-volatile storage and preventing the delay of any further writes of data to said non-volatile storage during said shutdown procedure.

4. A method according to claim 1 including the steps of detecting another failure of said power supply, said restart procedure terminating if said another failure occurs before a selected time delay, said restart procedure continuing to completion if said another failure occurs after said selected time delay.

5. A method according to claim 1 wherein said step of detecting said failure of said main power supply includes waiting for a time period after receiving an indication of said failure to determine if said failure is merely a transient, before said initiating said shutdown process.

6. A method of operating a computer system having a central processing unit (CPU), a main power supply, and a backup power supply, said method comprising the steps of:

(a) detecting a failure of the main power supply for said computer system and, in response thereto, providing power to said computer system from the backup power supply, and executing a shutdown process in the CPU;

(b) continuing said shutdown process to completion using said backup power supply even if said main power supply is restored before said completion;

(c) after said shutdown process is completed, beginning a restart process for said CPU if said main power supply is restored;

(d) automatically terminating said restart process if another power failure occurs before expiration of a selected time period, said restart process continuing to completion if said another failure occurs after expiration of said selected time period; and (e) within a predetermined period of time after said shutdown process is completed, automatically turning off said backup power supply if said main power supply has not been restored.

7. A method according to claim 6 wherein said computer system includes a plurality of devices external to said CPU and a nonvolatile memory, said CPU executes processes during normal operation and wherein said shutdown process includes writing state information to nonvolatile memory, wherein said state information includes the state of the processes executing on said computer system and device state information.

8. A method according to claim 6 wherein said computer system includes a plurality of devices external to said CPU and wherein said CPU executes processes during normal operation and wherein said restart process restores the state of processes and of devices existing before said shutdown process.

9. A method according to claim 6 wherein said step of detecting said failure of said main power supply includes waiting for a time period after receiving an indication of said failure to determine if said failure is merely a transient, before said executing said shutdown process.

10. A method according to claim 6 wherein said shutdown process includes the steps of copying state information from said CPU, processes and devices of said system to selected locations in volatile memory and then writing said selected locations to non-volatile memory.

11. A method of operating a computer system having a central processing unit (CPU), memory including volatile memory and non-volatile memory, a main power supply, a backup power supply, and a plurality of devices peripheral to said CPU, said method comprising the steps of:

(a) executing a process in the CPU, the process including instructions to store data in non-volatile memory, and using volatile memory to temporarily store the data which said process has instructed to be written to the non-volatile memory;

(b) detecting a failure of the main power supply for said computer system;

(c) entering a shutdown procedure using the backup power supply including writing to the non-volatile memory all data which is temporarily stored in said volatile memory prior to being written to said non-volatile memory and preventing further writes to said non-volatile memory from being temporarily stored in volatile memory, said shutdown procedure including copying a state of said process from volatile memory to non-volatile memory; and (d) completing said shutdown procedure even if said main power supply is restored during execution of said shutdown procedure.

12. A method according to claim 11 wherein said shutdown process includes the steps of copying state information from said CPU, processes and devices of said system to selected locations in volatile memory and then writing said selected locations to disk.

13. A method of operating a computer system having a central processing unit (CPU), memory including volatile memory and non-volatile memory, a main power supply, a backup power supply, and at least one device peripheral to said CPU controlled by said CPU during normal power operation from the main power supply, said method comprising the steps of:

(a) executing code by the CPU from the memory in normal operation, said code corresponding to processes being executed by the CPU, said execution of code including sending signals to said device and receiving signals from said device so as to control operation of said device;

(b) detecting occurrence of failure of the main power supply for said computer system, and continuing execution of code by said CPU using the backup power supply;

(c) after detecting said failure, initiating execution of a shutdown procedure by said CPU, including sending a sequence of signals between said CPU and said device, while continuing execution of said shutdown procedure by the CPU to save the current state of processes being executed, the sequence of signals including:
  (i) a first signal from said CPU to said device indicating powerfail;
  (ii) a second signal from said CPU to said device indicating halt of further device operations;
  (iii) a third signal from said device to said CPU indicating the amount of memory needed by the device to save state;
  (iv) a fourth signal from said CPU to said device including an address in said memory to save the state of said device;
(d) storing in said non-volatile memory the data written by said device to said address in memory; and
(e) shutting down said backup power supply and ceasing execution of code by said CPU.

14. A method according to claim 13 including the steps of:
  a) detecting restoration of said main power supply;
  b) initiating execution of a startup procedure by said CPU, including issuing a second sequence of signals to said device, said second sequence of signals including:
    i) a fifth signal to initialize the device and return device configuration;
    ii) a sixth signal to initiate loading state for said device from said memory, said state having been read from disk to memory; and
    iii) a seventh signal to initiate normal operation of said device.

15. A method of operating a computer system having a central processing unit (CPU), memory including volatile memory and non-volatile memory, a main power supply, and a backup power supply, said method comprising the steps of:
  (a) executing code by the CPU from the memory in normal operation while power for said computer system is supplied by the main power supply, said execution including controlling processes;
  (b) detecting the occurrence of failure of said main power supply, and continuing execution of code by said CPU using the backup power supply;
  (c) after detecting said failure, initiating execution of a shutdown procedure by said CPU, including issuing a sequence of signals from said CPU to said processes controlled by said CPU during normal operation immediately prior to said power failure, while continuing execution of said shutdown procedure by the CPU to save state of said processes being executed, the signals to said processes including:
    (i) "signal power failure" (SIGPWR) with code "power failure quiesce" (PFQUIESCE) during shutdown followed by "signal power failure" (SIGPWR) with code "power failure restart" (PFRESTART), or
    (ii) "signal terminated" (SIGTERM) with code "power failure quiesce" (PFQUIESCE) followed by "signal kill" (SIGKILL);
  (d) storing on said non-volatile memory said state; and
  (e) shutting down said backup power supply and ceasing execution of code by said CPU.

16. A method according to claim 15 including the step of marking a process for kill on powerfail before said shutdown procedure is executed.

* * * * *